US012371028B2

United States Patent
Cabello

(10) Patent No.: US 12,371,028 B2
(45) Date of Patent: Jul. 29, 2025

(54) OCCUPANT DETERMINATION DEVICE

(71) Applicant: Robert Bosch GmbH, Stuttgart (DE)

(72) Inventor: Joan Marc Berga Cabello, Kanagawa (JP)

(73) Assignee: Robert Bosch GmbH, Stuttgart (DE)

(*) Notice: Subject to any disclaimer, the term of this patent is extended or adjusted under 35 U.S.C. 154(b) by 436 days.

(21) Appl. No.: 17/238,695

(22) Filed: Apr. 23, 2021

(65) Prior Publication Data

US 2021/0331685 A1 Oct. 28, 2021

(30) Foreign Application Priority Data

Apr. 27, 2020 (JP) ................................ 2020-078674

(51) Int. Cl.
*B60W 40/08* (2012.01)
*B60N 2/00* (2006.01)
*B60N 2/90* (2018.01)

(52) U.S. Cl.
CPC .......... *B60W 40/08* (2013.01); *B60N 2/0022* (2023.08); *B60N 2/0025* (2023.08); *B60N 2/90* (2018.02); *B60N 2/0031* (2023.08); *B60N 2/0035* (2023.08); *B60N 2210/40* (2023.08); *B60N 2230/30* (2023.08); *B60W 2540/221* (2020.02)

(58) Field of Classification Search
CPC ......... B60N 2/002; B60N 2/90; B60W 40/08; B60W 2540/221
See application file for complete search history.

(56) References Cited

U.S. PATENT DOCUMENTS

2005/0071062 A1* 3/2005 Takao ............... B60R 21/01516
701/45
2019/0329671 A1* 10/2019 Tanaka ................. G06V 20/593

FOREIGN PATENT DOCUMENTS

| JP | 2005081967 A | | 3/2005 | |
| JP | 2011068299 A | | 4/2011 | |
| JP | 2012162196 A | | 8/2012 | |
| JP | 2004098785 | * | 10/2014 | ......... G01G 19/4142 |
| JP | 2014193705 | * | 10/2014 | ......... G01G 19/4142 |
| JP | 2014193705 A | | 10/2014 | |
| JP | 2017007563 | * | 1/2017 | ............. B60N 2/002 |

\* cited by examiner

*Primary Examiner* — Joan T Goodbody
(74) *Attorney, Agent, or Firm* — Michael Best & Friedrich LLP

(57) ABSTRACT

To provide an occupant determination device capable of improving reliability in results of determining an occupant's physique. An occupant determination device includes a tentative-determination processing unit provided in a seat of a vehicle and classifying a physique of an occupant seated on the seat by comparing a determination value set based on sensor values of a plurality of load sensors for detecting loads applied to the seat with predetermined load threshold values, and a determination processing unit determining the physique of the occupant by using tentative determination results by the tentative-determination processing unit, in which, when the number of the tentative determination results classified into a given class becomes equal to or larger than a predetermined threshold value in the tentative determination results of a predetermined number of samples, the determination processing unit determines the physique of the occupant to be the given class.

10 Claims, 16 Drawing Sheets

OCCUPANT DETERMINATION DEVICE

BACKGROUND OF THE INVENTION

The present invention relates to an occupant determination device.

When an airbag device mounted to a vehicle is operated, it is desirable that the airbag is deployed so as to fit a physique of an occupant seated on a seat. Accordingly, a load sensor is provided at the seat to determine a vacant state, a seated state of a child, a seated state of an adult and so on by using output values from the load sensor.

For example, an occupant determination device is proposed, for example, in JP-A-2014-193705 (Patent Literature 1), which is capable of ensuring execution of class transition even when a load fluctuates beyond a threshold value and exerting airbag control for protecting an occupant in the minimum level. Specifically, an occupant determination device disclosed in Patent Literature 1 includes load sensors detecting a load of an occupant seated on a vehicle seat, and a determination means for determining the presence of the occupant and the occupant's physique by classifying the load as a signal into one of a plurality of stored classes based on predetermined load threshold values, in which the determination means allows a current class to make a transition to a class adjacent to the current class when a load equal to or higher than the load threshold value between the current class and the class adjacent in a larger load side is inputted continuously for a threshold period of time.

SUMMARY OF THE INVENTION

In the occupant determination device described in Patent Literature 1, the threshold period of time at the time of executing the class transition is set to be longer as a class of a transition destination departs from a reference class by using a class initially determined when the occupant rides on the vehicle as a reference. However, in the occupant determination device described in Patent Literature 1, the threshold period of time is reset in a case where one of load values detected within the threshold period of time is a value belonging to a different class. Therefore, the class transition may be delayed excessively and accuracy in determination of a class to which the occupant belongs may be reduced.

The present invention has been made in view of the above problems and an object thereof is to provide an occupant determination device capable of improving reliability in results of determining the occupant's physique.

In view of the above problems, an occupant determination device according to an aspect of the present invention includes a tentative-determination processing unit provided in a seat of a vehicle and classifying a physique of an occupant seated on the seat by comparing a determination value set based on sensor values of a plurality of load sensors for detecting loads applied to the seat with predetermined load threshold values, and a determination processing unit determining the physique of the occupant by using tentative determination results by the tentative-determination processing unit, in which, when the number of the tentative determination results classified into a given class becomes equal to or larger than a predetermined threshold value in the tentative determination results of a predetermined number of samples, the determination processing unit determines the physique of the occupant to be the given class.

As described above, it is possible to improve reliability in results of determining the occupant's physique.

DETAILED DESCRIPTION

Hereinafter, a preferred embodiment of the present invention will be explained in detail with reference to the attached drawings. In the specification and the drawings, the same signs are given to components having substantially identical functional configurations to thereby omit repeated explanation.

<<1. Configuration Example of Occupant Determination Device>>

First, a configuration example of an occupant determination device according to an embodiment of the present invention will be explained.

Figure 1:
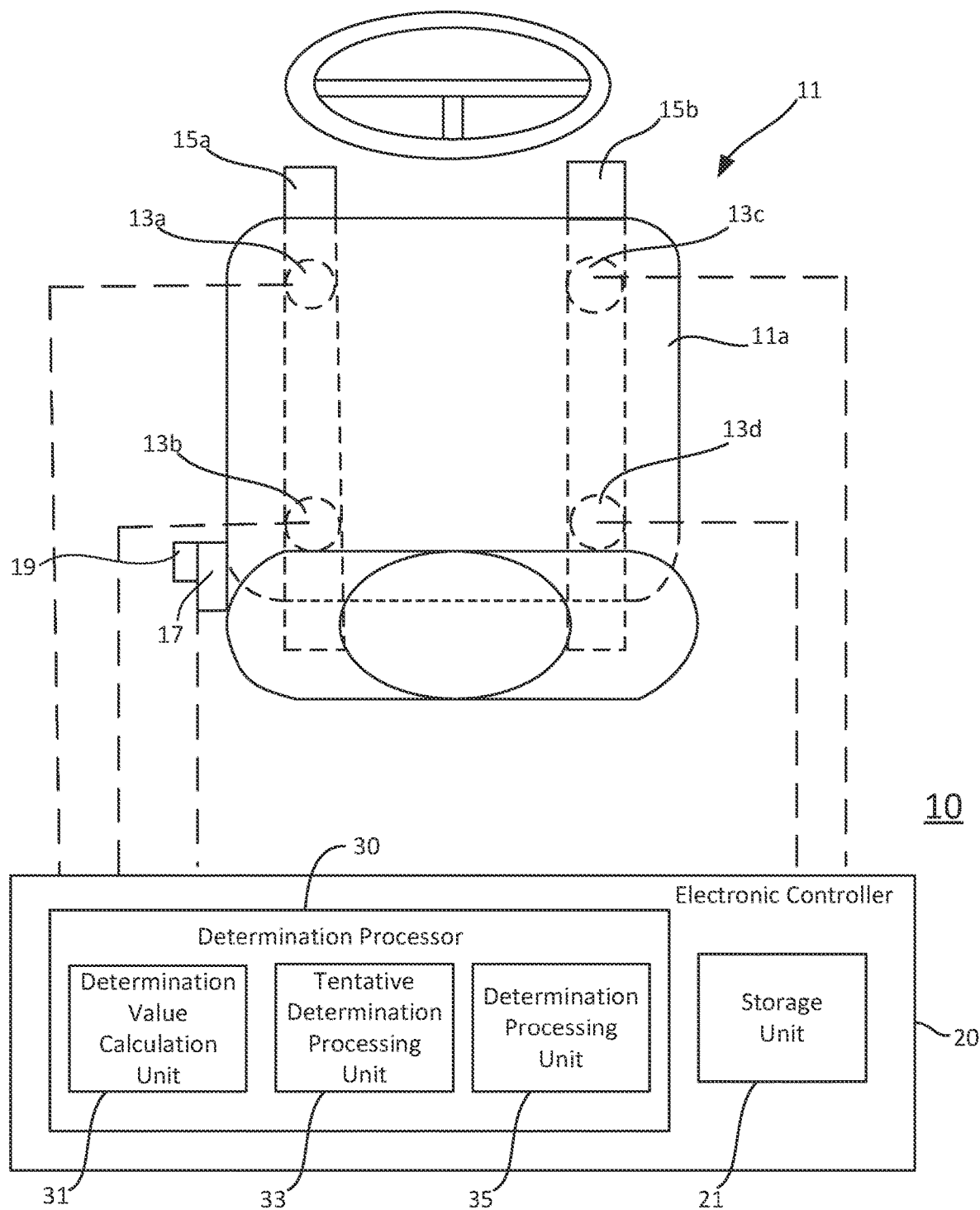
FIG. 1 is a schematic diagram showing a configuration example of an occupant determination device according to an embodiment of the present invention.
Figure 2:
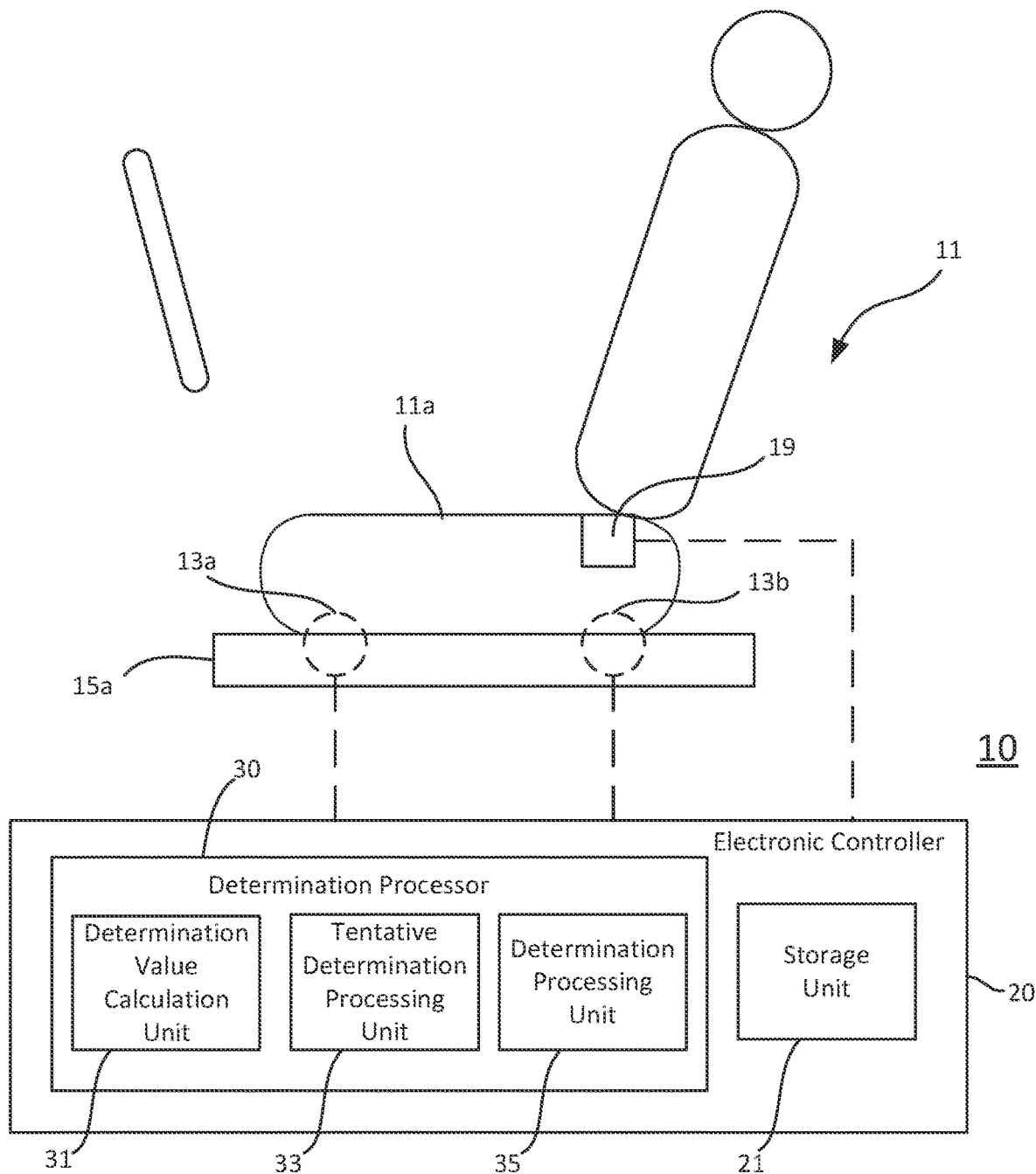
FIG. 2 is a schematic diagram showing the configuration example of the occupant determination device according to the embodiment.

FIG. 1 and FIG. 2 are schematic diagrams showing a configuration example of an occupant determination device 10 according to the embodiment. The configuration example shown in FIG. 1 and FIG. 2 is a configuration example for determining a physique of an occupant seated on a driver's seat (seat) 11 of a vehicle. FIG. 1 is a schematic diagram including the seat 11 seen from above, and FIG. 2 is a schematic diagram including the seat 11 seen from the side. The seat on which the occupant for determining the physique is seated is not limited to the driver's seat, and the occupant determination device 10 is configured to determine the physique of the occupant seated on other seats such as a passenger seat and a rear seat.

The occupant determination device 10 includes a plurality of load sensors 13a to 13d (hereinafter collectively called load sensors 13 when particular distinction is not required) provided on the seat 11 and an electronic controller 20 executing operation processing for determining an occupant's physique. The occupant determination device 10 according to the embodiment also includes a buckle sensor 19 detecting fastening of a buckle of a seat belt for the seat. The electronic controller 20 is configured to transmit, for example, a signal indicating a determination result of the occupant's physique to an airbag controller. The electronic controller 20 may also be provided as part of functions of the airbag controller. The airbag controller properly controls the magnitude (a pressure and the like) used at the time of deploying an airbag in accordance with the occupant's physique determined by the electronic controller 20.

<Load Sensors>

The load sensors 13 respectively detect loads applied to the seat 11. For example, the load sensors 13 output voltage signals corresponding to the loads to be detected. The sensor signals of the load sensors 13 are outputted to the electronic controller 20. In an example of the occupant determination device 10 shown in FIG. 1, four load sensors 13a to 13d are respectively provided at positions corresponding to four corner portions of a seat surface 11a of the seat 11. The four load sensors 13a to 13d are respectively provided at corresponding positions above seat rails 15a, 15b. Accordingly, the respective load sensors 13a to 13d can receive loads corresponding to the occupant's physique regardless of a seated position of the occupant.

The number of the load sensors 13 is not limited to four but may be three or less as well as five or more. It is preferable that the plural load sensors 13 are provided without being one-sided inside the seat surface 11a so that the load applied to the seat surface 11a can be received regardless of the seated position of the occupant.

<Buckle Sensor>

The buckle sensor 19 is provided at a buckle connector 17 formed in the seat 11, outputting a sensor signal indicating that the not-shown buckle of the seat belt is fastened to the buckle connector 17. The sensor signal from the buckle sensor 19 is outputted to the electronic controller 20. For example, the buckle sensor 19 may be a switch-type sensor in which a conductive state and a non-conductive state are switched by fastening the buckle of the seat belt to the buckle connector 17.

<Electronic Controller>

The electronic controller 20 executes operation processing for determining the occupant's physique based on sensor values from the plural load sensors 13. Part or all of the electronic controller 20 is formed by, for example, a microcomputer, a micro processor unit or the like. It is also preferable that part or all of the electronic controller 20 is formed by a component which can be updated such as firmware or, formed by a program module and the like executed by a command from a CPU (Central Processing Unit) and the like.

In the embodiment, the electronic controller 20 includes a determination processor 30 and a storage unit 21. The storage unit 21 includes memory devices such as a RAM (Random Access Memory) and a ROM (Read Only Memory), storing software programs, and data such as various parameters, detection results by various sensors, and results of operation processing. The storage unit 21 may also include at least one of storage media such as an HDD (Hard Disk Drive), a CD (Compact Disc), a DVD (Digital Versatile Disc), a SSD (Solid State Drive), a USB (Universal Serial Bus) flash, and a storage device.

The determination processor 30 includes a determination value calculation unit 31, a tentative-determination processing unit 33, and a determination processing unit 35. In the embodiment, the determination value calculation unit 31, the tentative-determination processing unit 33, and the determination processing unit 35 forming the determination processor 30 may be functions realized by execution of software programs by a processor such as the CPU.

(Determination Value Calculation Unit)

The determination value calculation unit 31 calculates a determination value W for classifying the occupant's physique based on sensor values of the plural load sensors 13. In the embodiment, the determination value calculation unit 31 calculates a total value by summing up loads indicated by voltage signals (hereinafter referred to as "detected loads") outputted from respective load sensors 13 as the determination value W. The detected loads detected by the plural load sensors 13 are summed up, thereby reducing deviation of the determination value W due to variations in seated positions of the occupant. The determination value calculation unit 31 can use voltage values outputted from the load sensors 13 as detected loads, and may use values obtained by converting the voltage values into loads (N or kgf) or the like as detected loads. The determination value calculation unit 31 may have a function of filtering sensor values outputted from respective load sensors 13, a function of adjusting a zero point and other functions.

(Tentative-Determination Processing Unit)

The tentative-determination processing unit 33 classifies the occupant's physique by comparing the determination value W set by the determination value calculation unit 31 with predetermined load threshold values. The tentative-determination processing unit 33 has a function of making tentative determination before finally determining the occupant's physique. For example, the tentative-determination processing unit 33 classifies the occupant's physique by using a first load threshold value W_thre_1 for classifying between a vacant state (class 0) and a seated state of a child (class 1), a second load threshold value W_thre_2 for classifying between the seated state of the child (class 1) and a seated state of an adult with a relatively small physique (class 2), and a third load threshold value W_thre_3 for classifying between the seated state of the adult with the relatively small physique (class 2) and a seated state of an adult with a relatively large physique (class 3). These load threshold values W_thre are adjusted based on previous measurement results or simulation results.

The tentative-determination processing unit 33 may change the load threshold value in accordance with the determined result in classification of the occupant's physique by the determination processing unit 35. Specifically, the tentative-determination processing unit 33 may change the load threshold value so that a range of a class to which a current tentative determination result by the tentative-determination processing unit 33 belongs is expanded in a state where the occupant's physique has been classified into classes other than the vacant state (class 0) and determined by the determination processing unit 35. Accordingly, it is possible to suppress easy transition to other classes due to vibration or the like of the detected load in the state where the occupant's physique has been classified into classes other than the vacant state (class 0) and determined. The tentative-determination processing unit 33 is configured not to change the load threshold value as the current classification of the occupant's physique is unknown when the determination result indicates that it is difficult to determine the occupant's physique by the determination processing unit 35.

Figure 3:
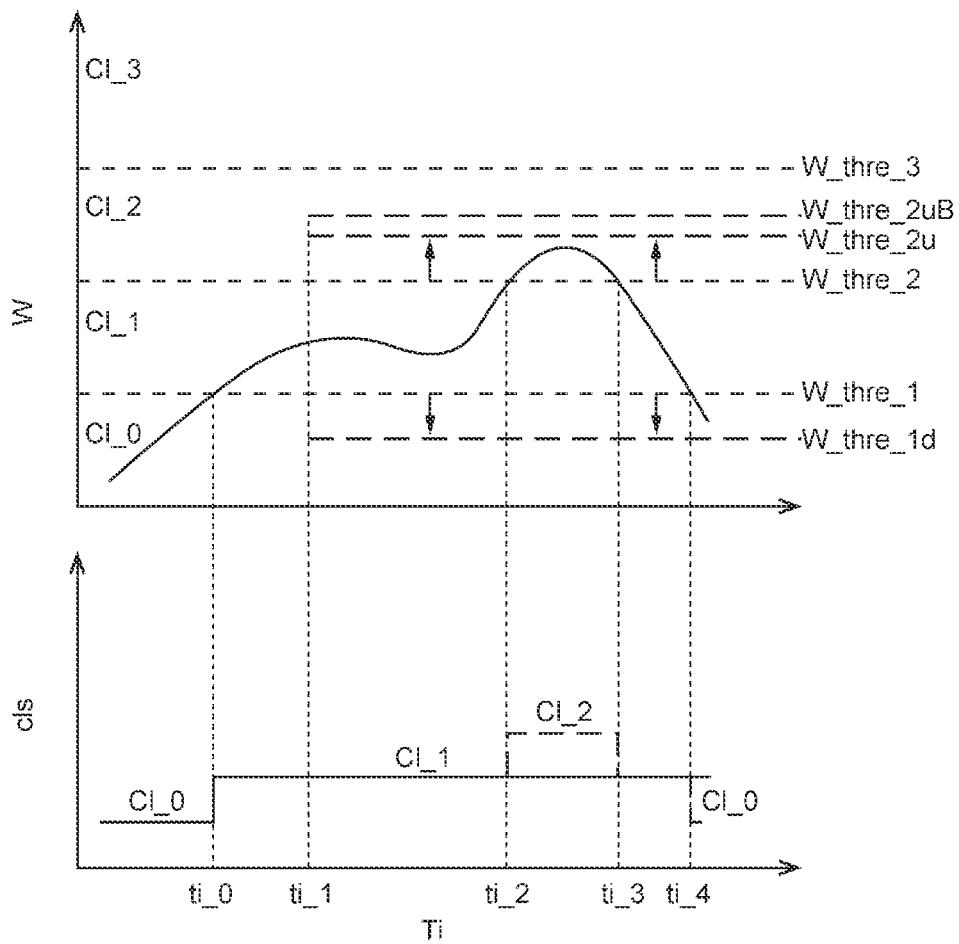
FIG. 3 is an explanatory chart showing an example of setting load threshold values by a tentative-determination processing unit of the occupant determination device according to the embodiment.

FIG. 3 is an explanatory chart showing an example of setting the load threshold values W_thre by the tentative-determination processing unit 33. The first load threshold value W_thre_1, the second load threshold value W_thre_2, and the third load threshold value W_thre_3 respectively indicate initial values. As the determination value W is lower than the first load threshold value W_thre_1 before a time ti_0, the classification of the occupant's physique is tentatively determined to be the class "0" C1_0. When the determination value W is equal to or higher than the first load threshold value W_thre_1 at the time ti_0, the classification of the occupant's physique is tentatively determined to be the class 1 C1_1. The classification of the occupant's physique is continued being tentatively determined to be the class 1 C1_1 after the time ti_0. At a time ti_1 when the classification of the occupant's physique is determined to be the class 1 C1_1 by the later-described determination processing unit 35, the first load threshold value W_thre_1 and the second load threshold value W_thre_2 adjacent to a range of the class 1 C1_1 are respectively changed to a first load threshold value (after correction) W_thre_1d and a second load threshold value (after correction) W_thre_2u. While the classification of the occupant's physique is determined to be the class 1 C1_1, the first load threshold value (after correction) W_thre_1d is changed to a lower value than the first load threshold value W_thre_1, and the second load threshold value (after correction) W_thre_2u is changed to a higher value than the second load threshold value W_thre_2 so that the range of the class 1 C1_1 is expanded.

According to the above, it is possible to suppress that transition is easily made to another class "0" or class 2 due to vibration of the detected loads by the load sensors 13. When the first load threshold value W_thre_1 and the second load threshold value W_thre_2 are not changed in the example of FIG. 3, the classification of the occupant's physique is tentatively determined to be the class 2 in a period from a time ti_2 to a time ti_3, and the classification of the occupant's physique is tentatively determined to be the class "0" in a period after a time ti_4. On the other hand, when the first load threshold value W_thre_1 and the second load threshold value W_thre_2 are changed, the classification of the occupant's physique is tentatively determined to be the class 1 continuously also in the period from the time ti_2 to the time ti_3 and the period after the time ti_4.

Also when the current determined result by the determination processing unit 35 is the class 2 or the class 3, the second load threshold value W_thre_2 and the third load threshold value W_thre_3 are changed in the same manner. That is, when the current determined result by the determination processing unit 35 is the class 2, the second load threshold value W_thre_2 is set to a second load threshold value (after correction) W_thre_2d, and the third load threshold value W_thre_3 is set to a third load threshold value (after correction) W_thre_3u as long as the tentative determination result by the tentative-determination processing unit 33 is the class 2. When the current determined result by the determination processing unit 35 is the class 3, the third load threshold value W_thre_3 is set to a third load threshold value (after correction) W_thre_3d as long as the tentative determination result by the tentative-determination processing unit 33 is the class 3.

The tentative-determination processing unit 33 may change the load threshold value so that the range of the class to which the current tentative determination result by the tentative-determination processing unit 33 belongs is further expanded when the determined result by the determination processing unit 35 is neither the determination result indicating that the seat 11 is vacant nor the determination result indicating that determination is difficult, and further, when the buckle of the seat belt for the seat is fastened. The fact that the buckle of the seat belt is fastened indicates that the occupant is seated on the seat 11; therefore, the tentative-determination processing unit 33 determines that reliability in the current tentative determination is relatively high, and suppresses easy transition to other classes.

For example, FIG. 3 also shows an example in which the second load threshold value W_thre_2 is further changed to a second load threshold value (after correction) W_thre_2uB on the increase side when the buckle of the seat belt is fastened. The tentative-determination processing unit 33 may be set so as not to determine that the seat 11 is in the vacant state (class 0) when the buckle of the seat belt for the seat is fastened.

(Determination Processing Unit)

The determination processing unit 35 determines the occupant's physique by using tentative determination results of the occupant's physique classified by the tentative-determination processing unit 33. In the embodiment, when the number of tentative determination results classified into a given class becomes a predetermined threshold value or more in tentative determination results of a predetermined number of samples, the determination processing unit 35 determines the occupant's physique to be the given class. The determination processing unit 35 repeatedly executes the above determination processing every time classification by the tentative-determination processing unit 33 is performed and a new tentative determination result is generated. Accordingly, the classification of the occupant's physique is determined by an occupation ratio in the tentative determination results of the predetermined number of samples by every calculation cycle. Therefore, even when some tentative determination results are classified into wrong classes due to vibration or the like of detected loads by the load sensors 13, the classification of the occupant's physique to be determined can be maintained in a right class. The threshold value used at this time may be the minimum positive number larger than the half of the number of samples.

Also in the embodiment, the determination processing unit 35 is set so as to perform primary determination processing using a predetermined first number of samples and a predetermined first threshold value and perform secondary determination processing by using a second number of samples larger than the first number of samples and a second threshold value after the occupant's physique is determined to be a given class by the primary determination processing. Accordingly, after the occupant's physique has been classified and determined into classes other than the vacant state (class 0) once, it is possible to suppress easy transition to other classes due to vibration or the like of the detected loads by the load sensors 13. Therefore, reliability in determination results of classifying the occupant's physique can be increased.

Figure 4:
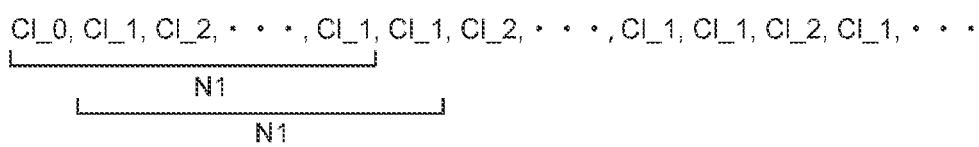
FIG. 4 is an explanatory view showing an example of a primary determination processing by a determination processing unit of the occupant determination device according to the embodiment.
Figure 5:
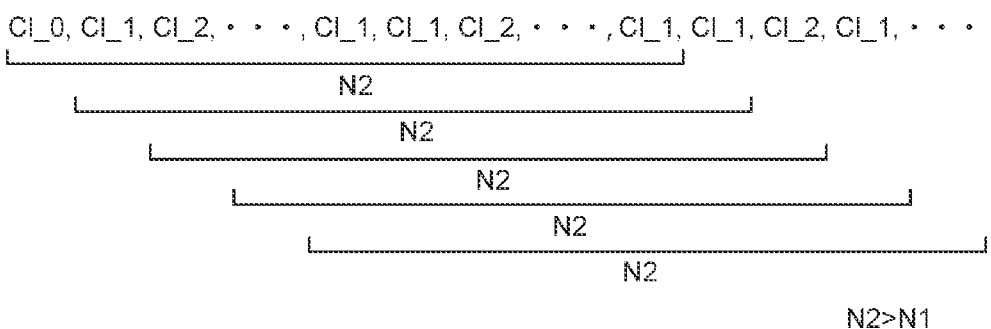
FIG. 5 is an explanatory view showing an example of a secondary determination processing by the determination processing unit of the occupant determination device according to the embodiment.

FIG. 4 shows an example of the primary determination processing by the determination processing unit 35 and FIG. 5 shows an example of the secondary determination processing by the determination processing unit 35. In the primary determination processing, when the tentative determination result classified into a particular class is equal to or higher than a first threshold value M1 by using tentative determination results C1_0 to C1_3 in a latest first number of samples N1 in tentative determination results C1_0 to C1_3 outputted from the tentative-determination processing unit 33 at predetermined time intervals, the classification of the occupant's physique is determined to be the class. The determination processing unit 35 repeats the processing at predetermined time intervals. In the secondary determination processing, when the tentative determination result classified into a particular class is equal to or higher than the second threshold value M2 by using tentative determination results C1_0 to C1_3 in a latest second number of samples N2 in tentative determination results C1_0 to C1_3 outputted from the tentative-determination processing unit 33, the classification of the occupant's physique is determined to be the class.

The determination processing unit 35 repeats the processing at predetermined time intervals. The second number of samples N2 is a higher value than the first number of samples N1, and the second threshold value M2 is a higher value than the first threshold value M1. For example, the first number of samples N1 is set to 49, the first threshold value M1 is set to 25, the second number of samples N2 is set to 1, 000, and the second threshold value M2 is set to 501. Respective values may be appropriately set, but the first threshold value M1 and the second threshold value M2 are set respectively to positive values exceeding more than half of the first number of samples N1 and the second number of samples N2. The larger the value of the second number of samples N2 is, the more the stability of the determined result in classification of the occupant's physique increases; however, it takes time to determine the classification of the occupant's physique when the value of the second number of samples N2 is too large. Therefore, it is preferable to set the second number of samples N2 to an appropriate value in consideration of these viewpoints.

The determination processing unit 35 may perform the secondary determination processing after the occupant's physique is determined to be a given class by the primary determination processing and when the buckle of the seat belt for the seat is fastened. Accordingly, the processing is transferred to the secondary determination processing when the classification of the occupant's physique is determined by the primary determination processing in the state where the occupant is assumed to be seated on the seat 1; therefore, reliability in the determination results of classifying the occupant's physique can be increased.

It is also preferable that the determination processing unit 35 ends the secondary determination processing and restarts the processing from the primary determination processing when determining that the seat is vacant (class 0) or that determination is difficult during the secondary determination after determining the classification of the occupant's physique by the primary determination processing and transferring the processing to the secondary determination processing. That is, when the occupant who has been seated leaves the seat 11 or the occupant's physique is not capable of being classified, it is preferable that the classification of the occupant's physique which is currently determined is reset and the primary determination processing is restarted. Accordingly, a period of time until the classification of the occupant's physique is determined next can be shortened when the occupant is seated from the vacant state of the seat, or when the determination of classification of the occupant becomes unstable.

Moreover, the determination processing unit 35 may determine the classification that the seat 11 is in the vacant state when the tentative determination results classified into the vacant state (class 0) by the tentative-determination processing unit 33 continue for equal to or higher than a threshold value M0 for determining the vacant seat which is lower than the first threshold value M1. That is, variation in detected loads by the load sensors 13 should be small when the occupant is not seated on the seat 11; therefore, the determination processing unit 35 may determine that the seat 11 is in the vacant state (class 0) when the tentative determination results classified into the vacant state (class 0) by the tentative-determination processing unit 33 continue for equal to or higher than the threshold value M0 for determining the vacant seat which is lower than the first threshold value M1 in the primary determination processing. Accordingly, the vacant state (class 0) can be speedily determined when the occupant is not seated on the seat 11. The threshold value M0 for determining the vacant seat can be set to an appropriate value lower than the first threshold value M1.

The determination processing unit 35 may be set so as not to determine that the seat 11 is in the vacant state (class 0) when the buckle of the seat belt for the seat is fastened.

<<2. Operation Examples of Occupant Determination Device>>

Next, operation examples of the occupant determination device 10 according to the embodiment will be explained with reference to flowcharts. In the operation examples described below, the tentative-determination processing unit 33 and the determination processing unit 35 classify the occupant's physique into the vacant state (class 0), the seated state of the child (class 1), the seated state of the adult with the relatively small physique (class 2), or the seated state of the adult with the relatively large physique (class 3).

<Operation Examples of Tentative-Determination Processing Unit>

(Classification into Class 1 to Class 3)

Figure 6:
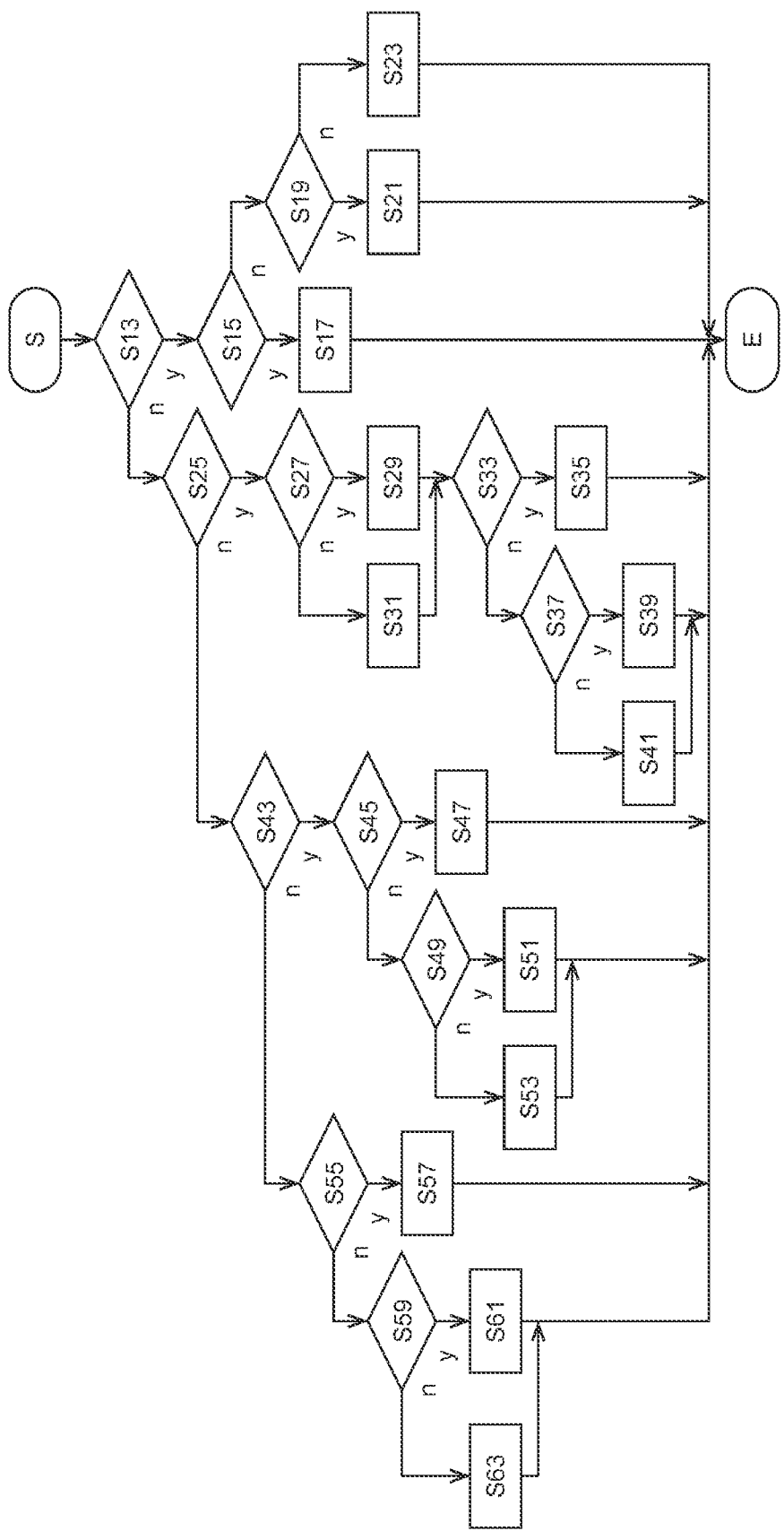
FIG. 6 is a flowchart showing an operation example in which classification into classes 1 to 3 is performed by the tentative-determination processing unit of the occupant determination device according to the embodiment.

FIG. 6 is a flowchart showing an operation example of the tentative-determination processing unit 33 in the electronic controller 20, which is the operation example in which the occupant's physique is classified into any of the class 1 to the class 3. The tentative-determination processing unit 33 tentatively determines the classification of the occupant's physique by using the first load threshold value W_thre_1, the first load threshold values (after correction) W_thre_1u, W_thre_1 d, the second load threshold value W_thre_2, the second load threshold values (after correction) W_thre_2u, W_thre_2d, the third load threshold value W_thre_3, the third load threshold values (after correction) W_thre_3u, W_thre_3d. The tentative-determination processing unit 33 executes a routine shown by the flowchart of FIG. 6 at predetermined time intervals (in every one processing cycle).

First, the tentative-determination processing unit 33 determines whether the current determined result by the determination processing unit 35 is indeterminable or the class "0" or not (Step S13). When Step S13 is affirmatively determined (S13/Yes), the tentative-determination processing unit 33 determines whether the determination value W calculated by the determination value calculation unit 31 is lower than the second load threshold value W_thre_2 or not (Step S15). When Step S15 is affirmatively determined (S15/YES), the tentative-determination processing unit 33 tentatively determines the classification of the occupant's physique to be the class 1 and end the present routine (Step S17).

On the other hand, when Step S15 is negatively determined (S15/No), the tentative-determination processing unit 33 determines whether the determination value W is lower than the third load threshold value W_thre_3 or not (Step S19). When Step S19 is affirmatively determined (S19/Yes), the tentative-determination processing unit 33 tentatively determines the classification of the occupant's physique to be the class 2 and ends the present routine (Step S21). On the other hand, Step S19 is negatively determined (S19/No), the tentative-determination processing unit 33 tentatively determines the classification of the occupant's physique to be the class 3 and ends the present routine (Step S23).

When the above Step S13 is negatively determined (S13/No), the tentative-determination processing unit 33 determines whether the current determined result by the determination processing unit 35 is class 1 or not (Step S25). When Step S25 is affirmatively determined (S25/Yes), the tentative-determination processing unit 33 determines whether the buckle of the seat belt is fastened or not (Step S27). When Step S27 is affirmatively determined (S27/Yes), the tentative-determination processing unit 33 changes the second load threshold value W_thre_2 to the second load threshold value (after correction) W_thre_2uB on the increase side so that the range of the class 1 is expanded (Step S29). On the other hand, when Step S27 is negatively determined (S27/No), the tentative-determination processing unit 33 holds the second load threshold value W_thre_2 (Step S31).

After the second load threshold value W_thre_2 is set, the tentative-determination processing unit 33 determines whether the determination value W is lower than set the second load threshold value W_thre_2 or not (Step S33). When Step S33 is affirmatively determined (S33/Yes), the tentative-determination processing unit 33 tentatively determines the classification of the occupant's physique to be the class 1 and ends the present routine (Step S35). On the other hand, when Step S33 is negatively determined (S33/No), the tentative-determination processing unit 33 determines whether the determination value W is lower than the third load threshold value W_thre_3 or not (Step S37). When Step S37 is affirmatively determined (S37/Yes), the tentative-determination processing unit 33 tentatively determines the classification of the occupant's physique to be the class 2 and ends the present routine (Step S39). On the other hand, when Step S37 is negatively determined (S37/No), the tentative-determination processing unit 33 tentatively determines the classification of the occupant's physique to be the class 3 and ends the present routine (Step S41).

The above Step S25 is negatively determined (S25/No), the tentative-determination processing unit 33 determines whether the previous determined result by the determination processing unit 35 is the class 2 or not (Step S43). When Step S43 is affirmatively determined (S43/Yes), the tentative-determination processing unit 33 determines whether the determination value W is equal to or lower than the second load threshold value (after correction) W_thre_2d or not (Step S45). When Step S45 is affirmatively determined (S45/Yes), the tentative-determination processing unit 33 tentatively determines the classification of the occupant's physique to be the class 1 and ends the present routine (Step S47).

On the other hand, when Step S45 is negatively determined (S45/No), the tentative-determination processing unit 33 determines whether the determination value W is lower than the third load threshold value (after correction) W_thre_3u or not (Step S49). When Step S49 is affirmatively determined (S49/Yes), the tentative-determination processing unit 33 tentatively determines the classification of the occupant's physique to be the class 2 and ends the present routine (Step S51). On the other hand, when Step S49 is negatively determined (S49/No), the tentative-determination processing unit 33 tentatively determines the classification of the occupant's physique to be the class 3 and ends the present routine (Step S53).

When the above Step S43 is negatively determined (S43/No), the tentative-determination processing unit 33 determines whether the determination value W is equal to or lower than the second load threshold value (after correction) W_thre_2d or not (Step S55). When Step S55 is affirmatively determined (S55/Yes), the tentative-determination processing unit 33 tentatively determines the classification of the occupant's physique to be the class 1 and ends the present routine (Step S57). On the other hand, when Step S55 is negatively determined (S55/No), the tentative-determination processing unit 33 determines whether the determination value W is lower than the third load threshold value (after correction) W_thre_3d or not (Step S59). When Step S59 is affirmatively determined (S59/Yes), the tentative-determination processing unit 33 tentatively determines the classification of the occupant's physique to be the class 2 and ends the present routine (Step S61). On the other hand, when Step S59 is negatively determined (S59/No), the tentative-determination processing unit 33 tentatively determines the classification of the occupant's physique to be the class 3 and ends the present routine (Step S63).

As described above, the tentative-determination processing unit 33 executes the above routine at predetermined time intervals and tentatively determines the classification of the occupant's physique to any of the class 1 to class 3. As described above, the load threshold value W_thre is changed in accordance with the current determined result by the determination processing unit 35 so that the range of the determined class is expanded. Therefore, it is possible to suppress easy transition to another class due to vibration of the detected loads by the load sensors 13. In the example of the flowchart shown in FIG. 6, the second load threshold value W_thre_2 for distinguishing between the class 1 and the class 2 is also changed depending on whether the buckle of the seat belt is fastened or not when the class is tentatively determined as the class 1. Accordingly, it is possible to respond to the increase of the load added to the load sensors 13 by a fastening force of the seat belt and to suppress the reduction in determination accuracy of the class 1 and the class 2 mainly at the time of distinguishing between an adult and a child. Therefore, certainty in switching to turn off the airbag device can be increased in a case where the occupant to be detected is a child.

(Classification of Class "0")

Figure 7:
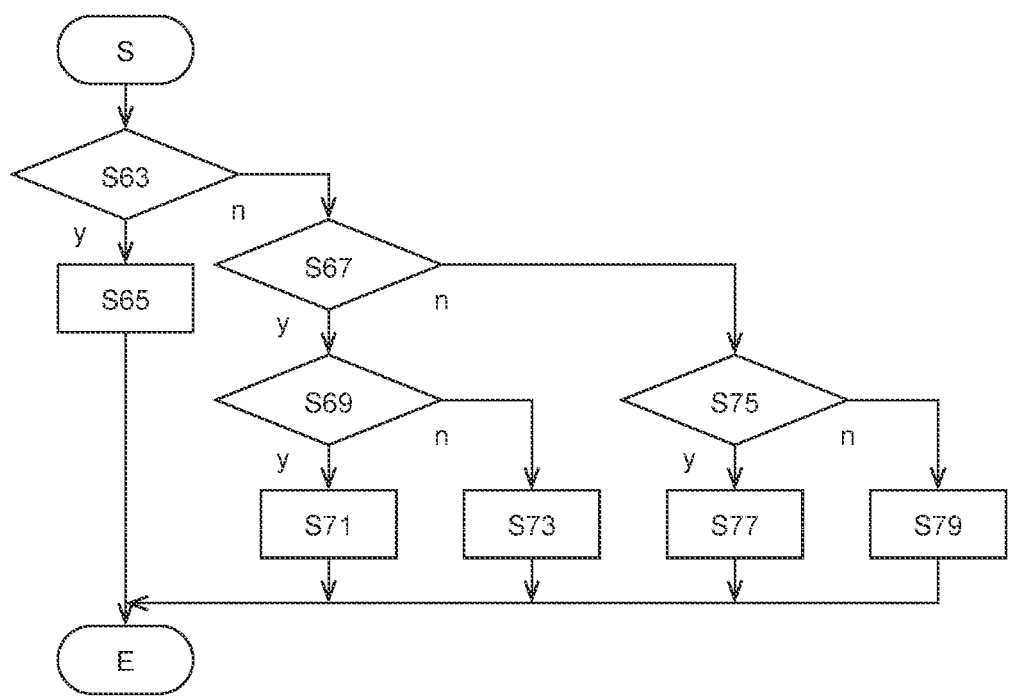
FIG. 7 is a flowchart showing an operation example in which classification into a class "0" is performed by the tentative-determination processing unit of the occupant determination device according to the embodiment.
Figure 8:
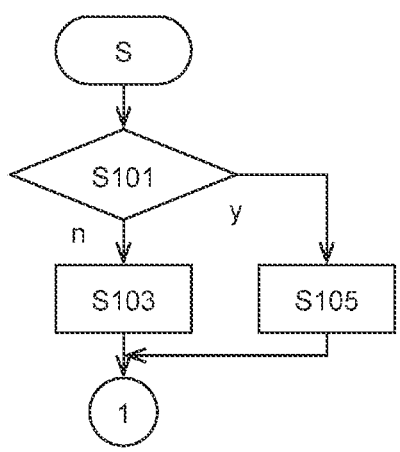
FIG. 8 is a flowchart showing an operation example by the determination processing unit of the occupant determination device according to the embodiment.
Figure 9:
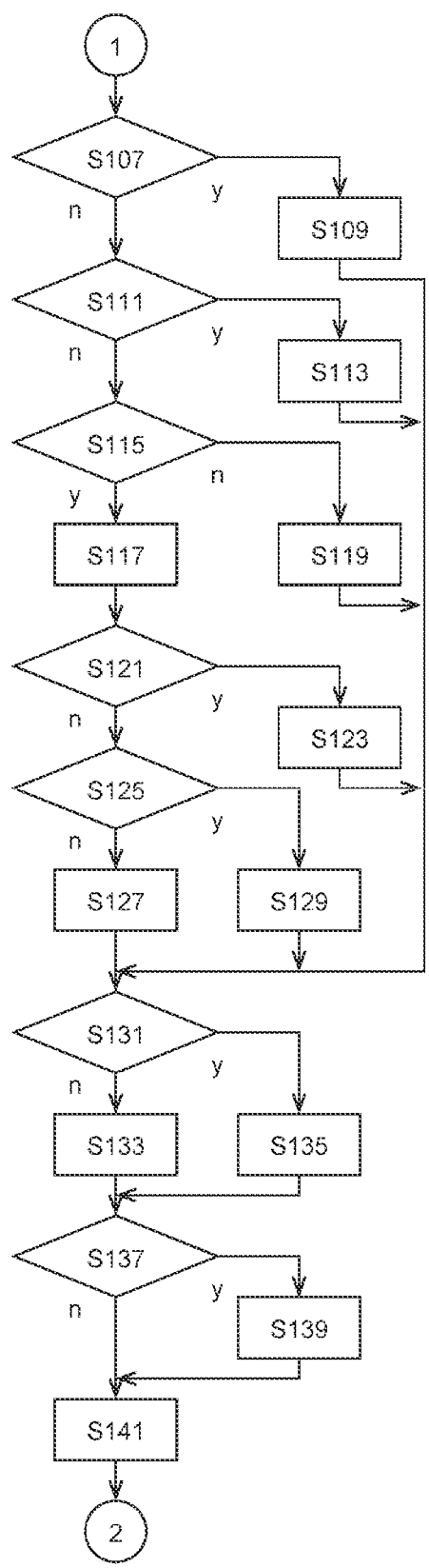
FIG. 9 is a flowchart showing an operation example by the determination processing unit of the occupant determination device according to the embodiment.
Figure 10:
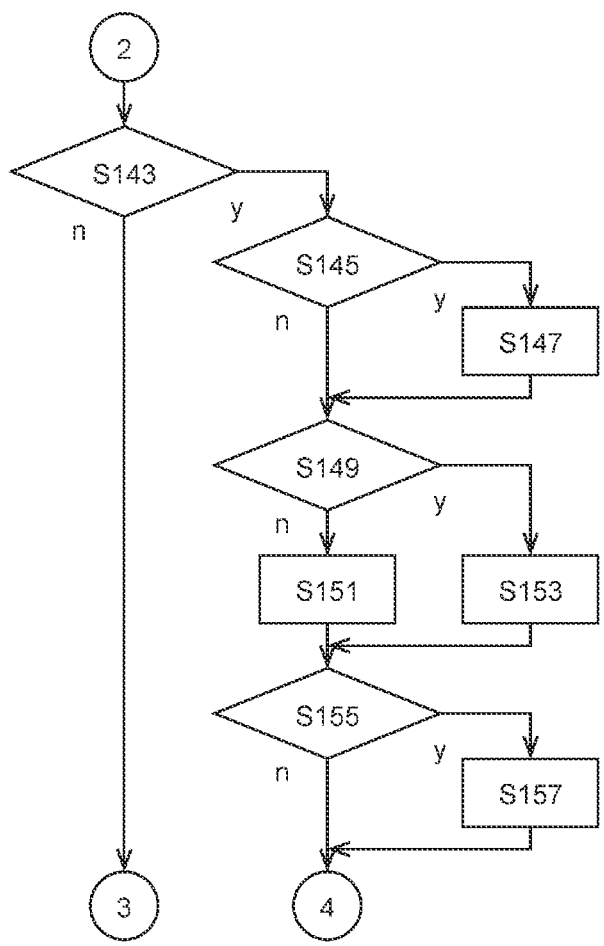
FIG. 10 is a flowchart showing an operation example by the determination processing unit of the occupant determination device according to the embodiment.
Figure 11:
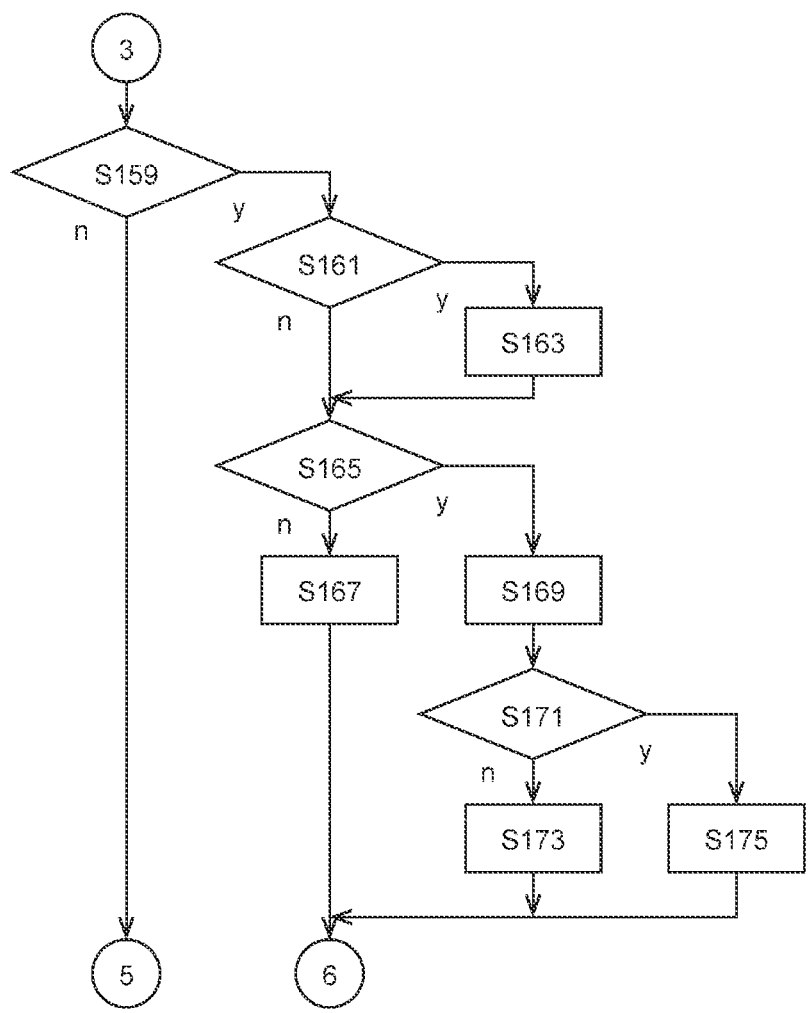
FIG. 11 is a flowchart showing an operation example by the determination processing unit of the occupant determination device according to the embodiment.
Figure 12:
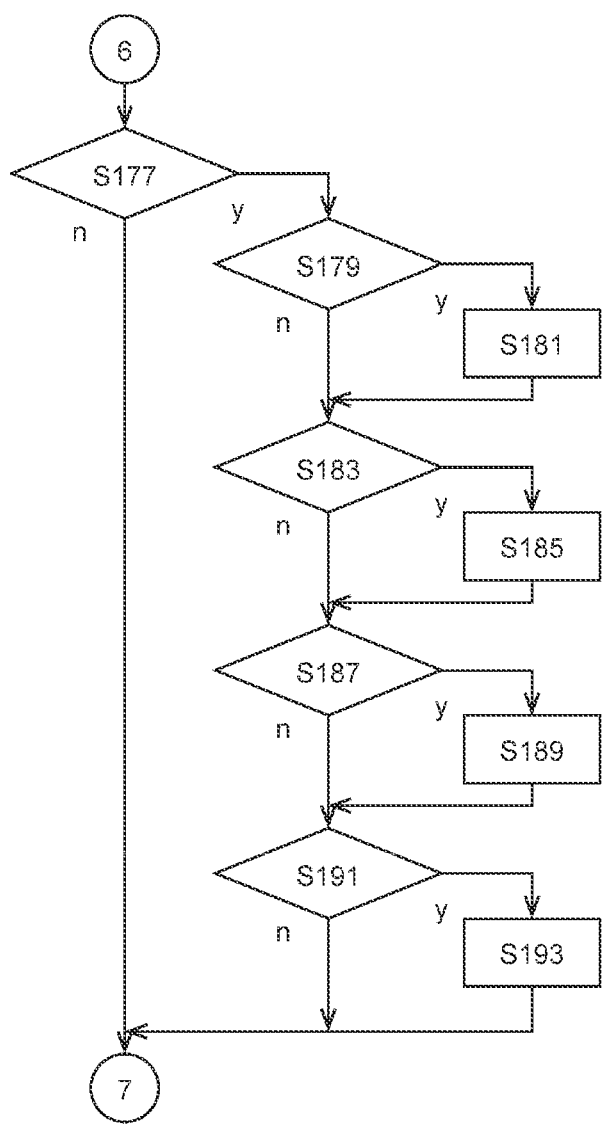
FIG. 12 is a flowchart showing an operation example by the determination processing unit of the occupant determination device according to the embodiment.
Figure 13:
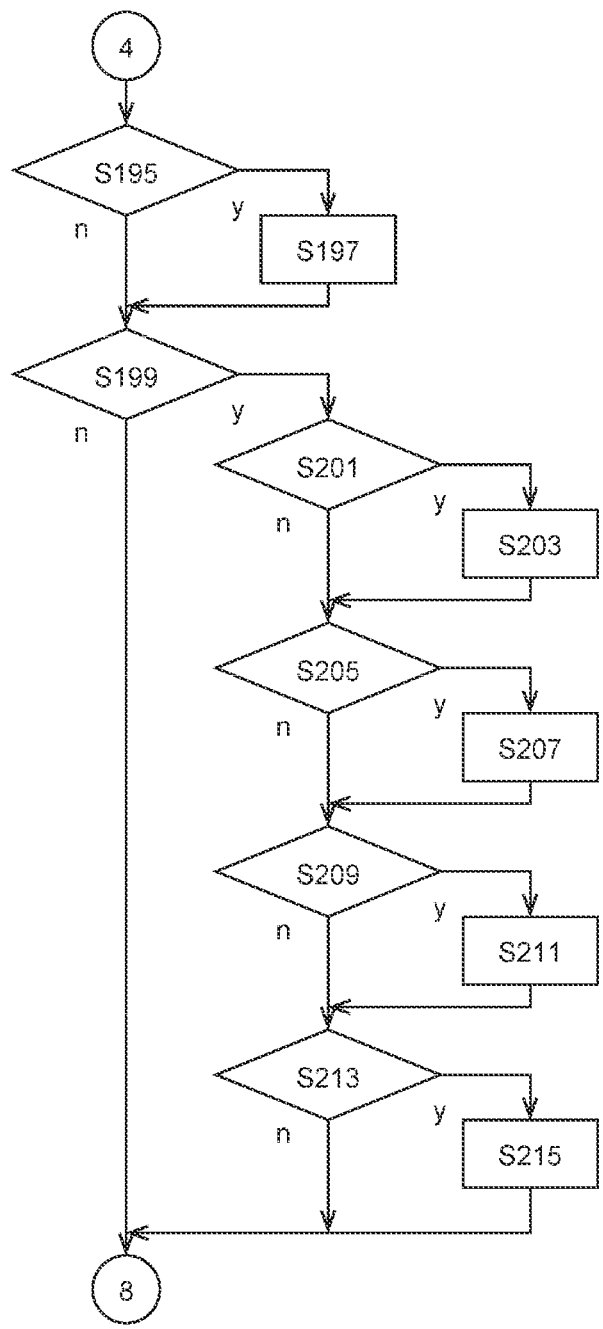
FIG. 13 is a flowchart showing an operation example by the determination processing unit of the occupant determination device according to the embodiment.
Figure 14:
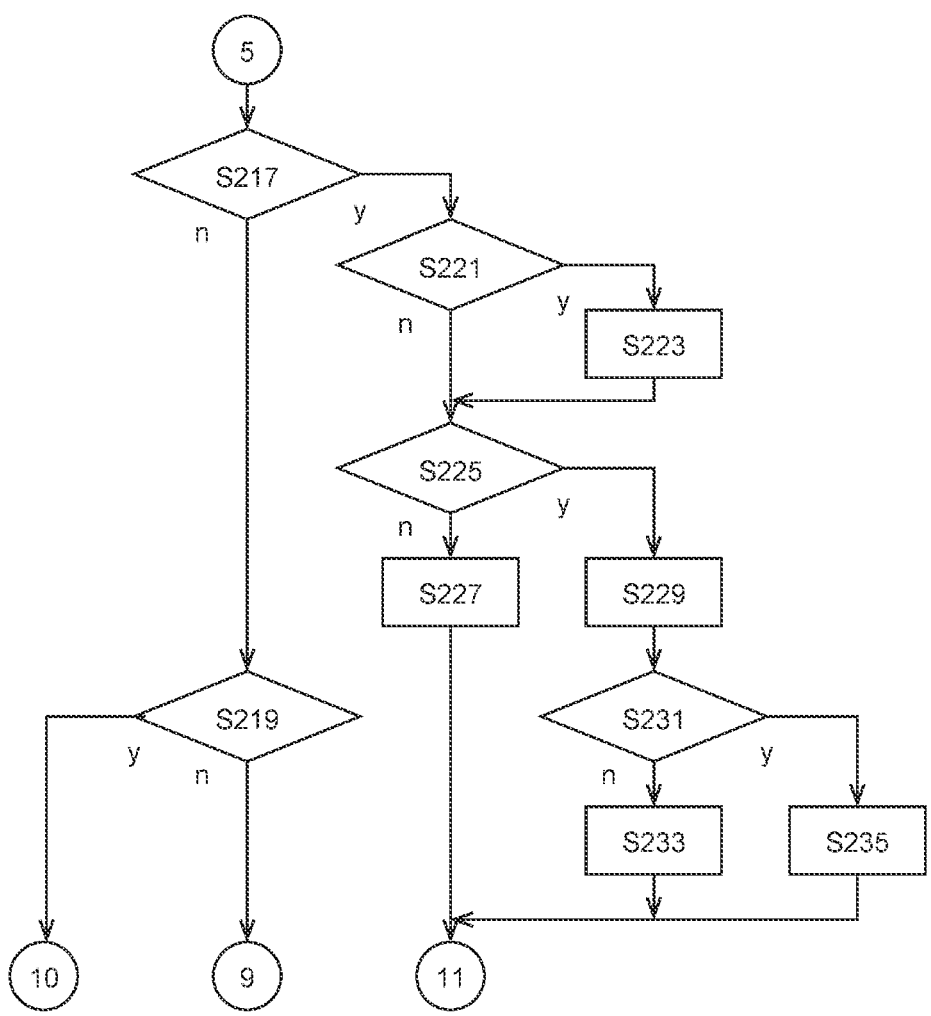
FIG. 14 is a flowchart showing an operation example by the determination processing unit of the occupant determination device according to the embodiment.
Figure 15:
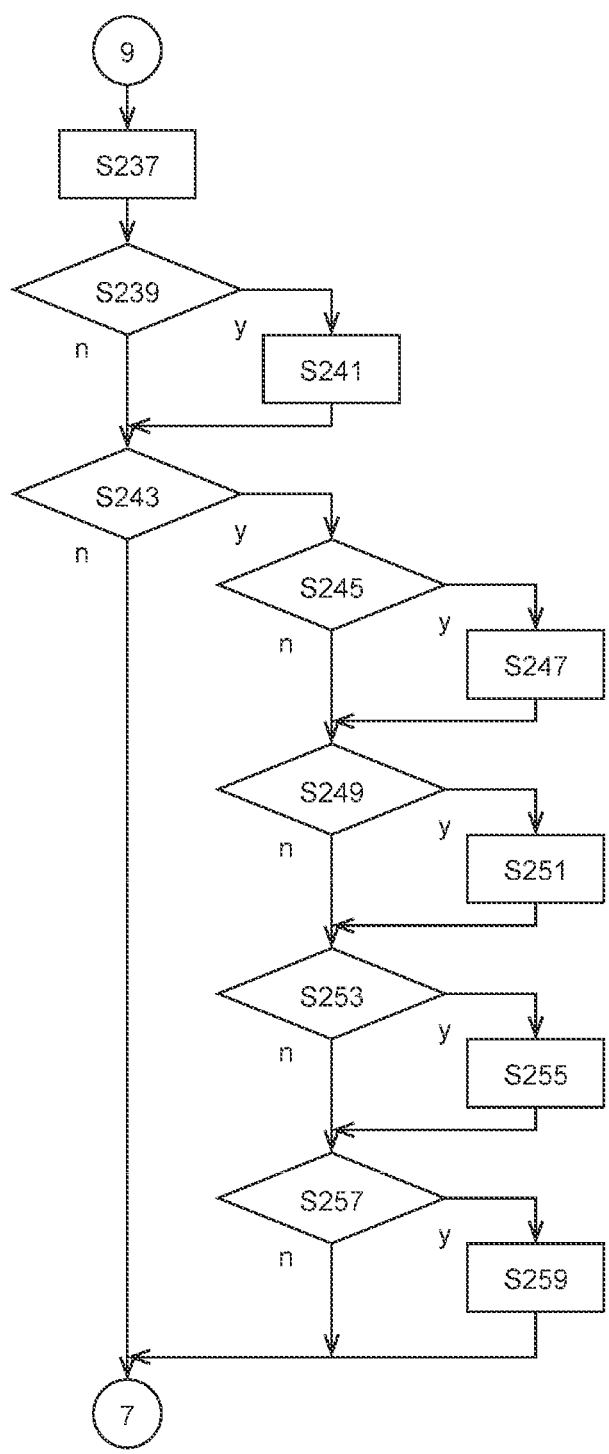
FIG. 15 is a flowchart showing an operation example by the determination processing unit of the occupant determination device according to the embodiment.
Figure 16:
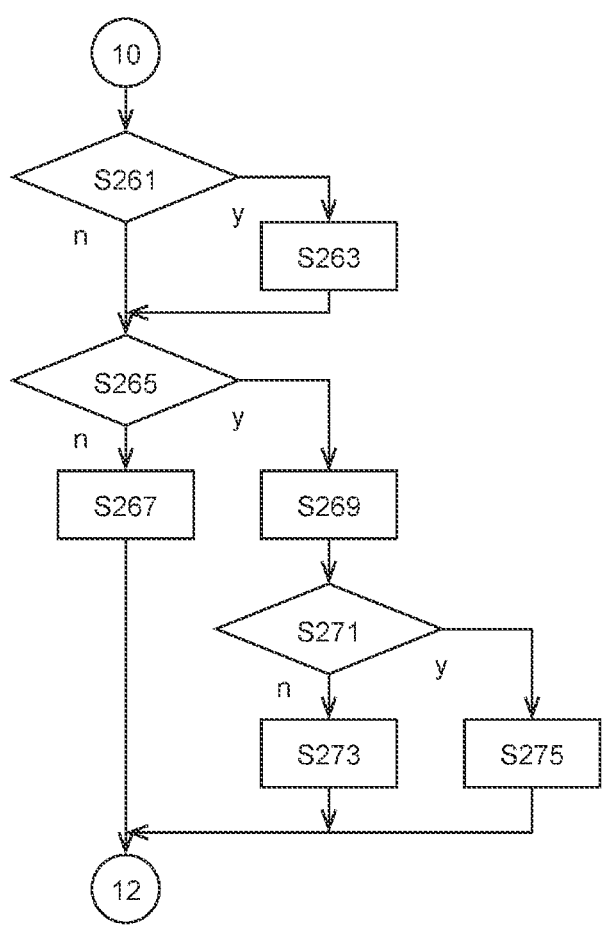
FIG. 16 is a flowchart showing an operation example by the determination processing unit of the occupant determination device according to the embodiment.
Figure 17:
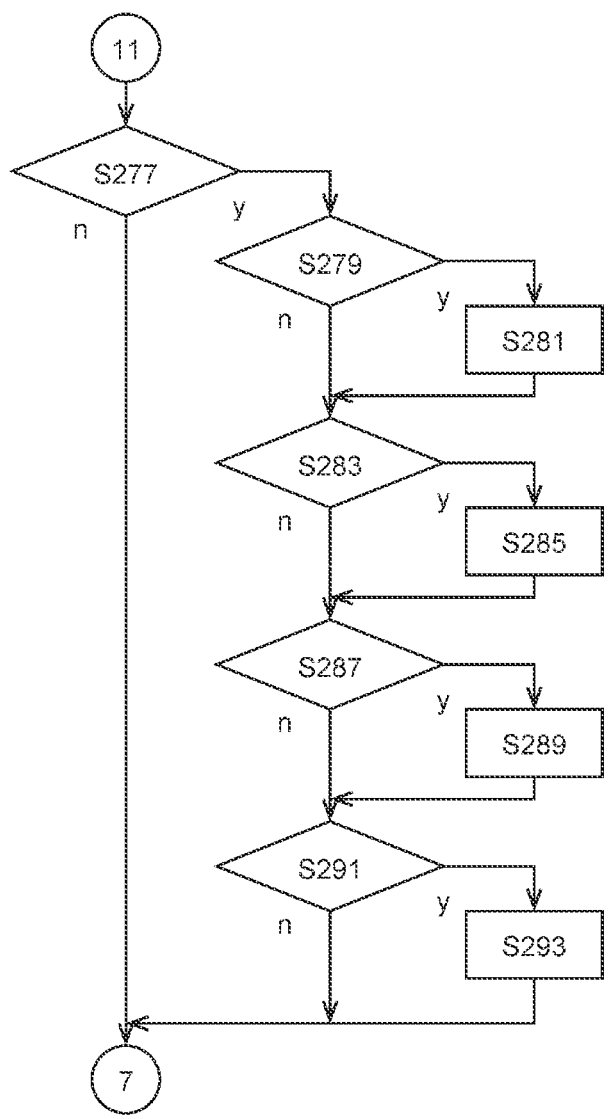
FIG. 17 is a flowchart showing an operation example by the determination processing unit of the occupant determination device according to the embodiment.
Figure 18:
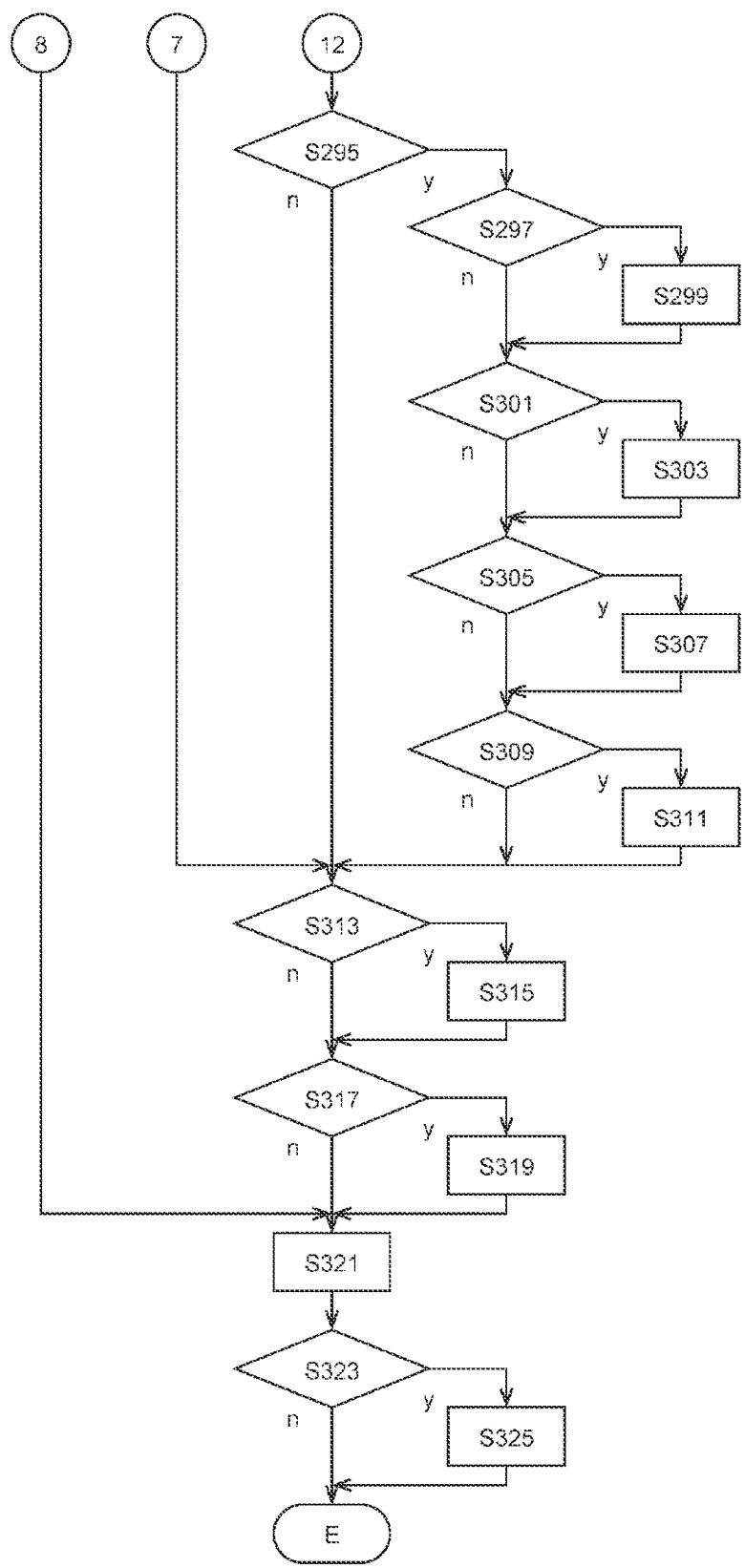
FIG. 18 is a flowchart showing an operation example by the determination processing unit of the occupant determination device according to the embodiment.

FIG. 7 is a flowchart showing an operation example of the tentative-determination processing unit 33 in the electronic controller 20, which shows the operation example in which the occupant's physique is classified into the class "0" (vacant state). The tentative-determination processing unit 33 tentatively determines the class "0" (vacant state) by using the first load threshold value W_thre_1. The tentative-determination processing unit 33 executes a routine illustrated in the flowchart of FIG. 7 at predetermined time intervals (in every one processing cycle).

First, the tentative-determination processing unit 33 determines whether the buckle of the seat belt is fastened or not (Step S63). When Step S63 is affirmatively determined (S63/Yes), the tentative-determination processing unit 33 prohibits the tentative determination of the vacant state (class "0") and ends the present routine (Step S65). On the other hand, when Step S63 is negatively determined (S63/No), the tentative-determination processing unit 33 determines whether the current determined result by the determination processing unit 35 is indeterminable or the class "0" (Step S67).

When Step S67 is affirmatively determined (S67/Yes), the tentative-determination processing unit 33 determines whether the determination value W is lower than the first load threshold value W_thre_1 or not (Step S69). When Step S69 is affirmatively determined (S69/Yes), the tentative-determination processing unit 33 tentatively determines the classification of the occupant's physique to be the class "0" and ends the present routine (Step S71). On the other hand, when Step S69 is negatively determined (S69/No), the tentative-determination processing unit 33 prohibits the tentative determination of the vacant state (class "0") and ends the present routine (Step S73).

When the above Step S67 is negatively determined (S67/No), the tentative-determination processing unit 33 determines whether the determination value W is equal to or lower than the first load threshold value (after correction) W_thre_1 d or not (Step S75). When Step S75 is affirmatively determined (S75/Yes), the tentative-determination processing unit 33 tentatively determines the classification of the occupant's physique to be the class "0" and ends the present routine (Step S77). On the other hand, when Step S75 is negatively determined (S75/No), the tentative-determination processing unit 33 prohibits the tentative determination of the vacant state (class "0") and ends the present routine (Step S79). As described above, the tentative-determination processing unit 33 executes the above routine and tentatively determines whether the seat 11 is in the vacant state (class 0) or not at predetermined time intervals.

In the above embodiment, the tentative-determination processing unit 33 executes classification about whether the seat 11 is in the class "0" or not separately from the classification into class 1 to class 3. The determination processing unit 35 determines the classification of the occupant's physique by using the tentative determination results of classification of the class 1 to class 3 and the tentative determination results of classification about whether the seat is in the class "0" or not by the tentative-determination processing unit 33.

<Operation Example of Determination Processing Unit>

FIG. 8 to FIG. 18 are flowcharts showing operation examples by the determination processing unit 35 in the electronic controller 20. The determination processing unit 35 executes the routine described below at predetermined time intervals (in every one processing cycle).

First, the determination processing unit 35 determines whether the present state corresponds to any of a state where the buckle is fastened at present or a state where the buckle was fastened last time or not by referring to a buckle fastening flag indicating fastening or non-fastening of the buckle of the seat belt (Step S101). When Step S101 is affirmatively determined (S101/Yes), the determination processing unit 35 sets the buckle fastening flag to a state indicating the fastening and sets a switching time in which transition of a determination processing mode is made from the primary determination processing to the secondary determination processing to a first switching time BTZ (Step S105). On the other hand, when Step S101 is negatively determined (S101/No), the determination processing unit 35 sets the switching time in which transition of the determination processing mode is made from the primary determination processing to the secondary determination processing to a second switching time TZ which is shorter than the first switching time BTZ (Step S103).

Accordingly, in the case where the buckle of the seat belt is fastened, the switching time in which transition of the determination processing mode is made from the primary determination processing to the secondary determination processing becomes longer as compared with the case where the buckle of the seat belt is not fastened. For example, the first switching time BTZ may be set to processing cycles of 204 times and the second switching time TZ may be set to processing cycles of 61 times.

Next, the determination processing unit 35 determines whether the current determined result indicates that the determination is difficult or not (Step S107). When Step S107 is affirmatively determined (S107/Yes), the determination processing unit 35 sets the determination processing mode to the primary determination processing and switches on an initial mode indicating that the classification of the occupant's physique is the first time (Step S109), and the process proceeds to Step S131.

On the other hand, when Step S107 is negatively determined (S107/No), the determination processing unit 35 determines whether the current determined result is the class "0" (vacant state) or not (Step S111). When Step 111 is affirmatively determined (S111/Yes), the determination processing unit 35 sets the determination processing mode to the primary determination processing, switching off the initial mode, and setting the buckle fastening flag to the state indicating non-fastening, and further, setting the switching time in which the determination processing mode is returned from the secondary determination mode to the primary determination mode to zero (Step S113), then, the process proceeds to Step S131.

On the other hand, when Step S111 is negatively determined (S111/No), the determination processing unit 35 determines whether the current determination processing mode is the primary determination processing or not (Step S115). When Step S115 is negatively determined (S115/No), the determination processing unit 35 sets a counter of the switching time (hereinafter also referred to as an "off-counter") for returning the determination processing mode from the secondary determination processing to the primary determination processing to zero (Step S119), and the process proceeds to Step S131.

On the other hand, when Step S115 is affirmatively determined (S115/Yes), the determination processing unit 35 counts up the off-counter (Step S117), and the process proceeds to Step S121. Next, the determination processing unit 35 determines whether a counter value of the off-counter is equal to or higher than the switching time (TZ or BTZ) set in Step S103 or Step S105 and whether the initial mode is switched off or not (Step S121). When Step S121 is affirmatively determined (S121/Yes), the determination processing unit 35 sets the determination processing mode to the secondary determination processing and sets the off-counter to zero (Step S123), then, the process proceeds to Step S131.

On the other hand, when Step S121 is negatively determined (S121/No), whether the counter value of the off-counter is equal to or higher than a threshold value ITZ of a switching time in which an ignition switch of the vehicle is turned on and transition is made to the determination processing mode in which the occupant's physique is initially determined, and whether the initial mode is switched on or not are determined (Step S125). When Step S125 is affirmatively determined (Step S125/Yes), the determination processing unit 35 sets the determination processing mode to the secondary determination processing and sets the off-counter to zero, and further, switches off the initial mode (Step S129) and the process proceeds to Step S131. On the other hand, when Step S125 is negatively determined, the determination processing unit 35 sets the determination processing mode to the primary determination processing (Step S127) and the process proceeds to Step S131.

In Step S131, the determination processing unit 35 determines whether the tentative determination result of classification indicating whether the state is in the class "0" or not by the tentative-determination processing unit 33 is the class "0" or not (Step S131). When Step S131 is affirmatively determined (Step S131/Yes), the determination processing unit 35 sets a tentative determination result CDD used for determining classification of the occupant's physique to the class "0" (Step S135), and the process proceeds to Step S137. On the other hand, when Step S131 is negatively determined (Step S13/No), the determination processing unit 35 sets the tentative determination result CDD used for determining classification of the occupant's physique to a class classified into any of the class 1 to class 3 by the tentative-determination processing unit 33 (Step S133), and the process proceeds to Step S137.

Next, the determination processing unit 35 determines whether an occupant determination status is in a mode in which the current determined result is maintained (determined result maintaining mode) or not (Step S137). The occupant determination status is a status indicating that determination of classification of the occupant's physique in the processing cycle of this time can be updated (normal mode), that the determined result of last time is maintained (determined result maintaining mode), or that the determination is difficult (abnormal mode).

When Step S137 is negatively determined (S137/No), the process directly proceeds to Step S141. On the other hand, when Step S147 is affirmatively determined (S137/Yes), the determination processing unit 35 counts up a counter (indeterminable counter) Cnt_ID for maintaining the current determined result and counting the tentative determination result CDD indicating that the determination is difficult (Step S139), and the process proceeds to Step S141.

In Step S141, the determination processing unit 35 calculates the number of samples N of accumulated tentative determination results CDD used for the primary determination processing or the secondary determination processing (Step S141). Specifically, the determination processing unit 35 calculates the total number of counter values by adding counter values of a counter for counting the tentative determination results CDD of the class "0" (class 0 counter) Cnt_0, a counter for counting the tentative determination results CDD of the class 1 (class 1 counter) Cnt_1, a counter for counting the tentative determination results CDD of the class 2 (class 2 counter) Cnt_2, a counter for counting the tentative determination results CDD of the class 3 (class 3 counter) Cnt_3, and the indeterminable counter Cnt_ID.

The determination processing unit 35 also calculates the number of samples N of the tentative determination results CDD used for determining the vacant state (class 0) in Step S141. Specifically, the determination processing unit 35 calculates the total number of counter values by adding the counter value of the class "0" counter Cnt_0 and a counter value of a counter for counting tentative determination results CDD of classes other than the class "0" (Non-class 0 counter) Cnt_N0.

Next, the determination processing unit 35 determines whether the tentative determination result CDD in the processing cycle of this time is the class "0" or not (Step S143). When Step S143 is negatively determined (S143/No), the process proceeds to later-described Step S159. On the other hand, when Step S143 is affirmatively determined (S143/Yes), the determination processing unit 35 determines whether the counter value of the class "0" counter Cnt_0 is lower than the first number of samples N1 for the primary determination processing or not (Step S145). When Step S145 is negatively determined (S145/No), the process directly proceeds to Step S149. On the other hand, when Step S145 is affirmatively determined (S145/Yes), the determination processing unit 35 counts up the class "0" counter Cnt_0 (Step S147), and the process proceeds to Step S149.

In Step S149, the determination processing unit 35 determines whether the counter value of the class "0" counter Cnt_0 is equal to or higher than the threshold value M0 for determining the vacant seat set for determining the class "0" or not (Step S149). When Step S149 is affirmatively determined (Step S149/Yes), the determination processing unit 35 determines the classification of the occupant's physique to be the class "0" and switches on a reset flag for resetting counter values of respective counters (Step S153), and the process proceeds to Step S155. On the other hand, when Step S149 is negatively determined (S149/No), the determination processing unit 35 maintains the classification of the occupant's physique in the determined result of last time and switches off the reset flag for resetting respective counter values (Step S151), and the process proceeds to Step S155.

In Step S155, the determination processing unit 35 determines which of the following conditions is satisfied: whether the counter value of the class "0" counter Cnt_0 is lower than the second number of samples N2 for the second determination processing and the determination processing mode is set to the secondary determination processing, or the counter value of class "0" counter Cnt_0 is lower than the first number of samples N1 for the primary determination processing and the determination processing mode is set to the primary determination processing (Step S155). When Step S155 is negatively determined (S155/No), the process directly proceeds to Step S195. On the other hand, when Step S155 is affirmatively determined (S155/Yes), the determination processing unit 35 counts up the class "0" counter Cnt_0 (Step S157), and the process proceeds to later-described Step S195.

In the above Step 143, when Step S143 is affirmatively determined (S143/Yes), the determination processing unit 35 determines whether the tentative determination result CDD in the processing cycle of this time is the class 1 or not (Step S159). When Step S159 is negatively determined (Step S159/No), the process proceeds to later-described Step S217. On the other hand, when Step S159 is affirmatively determined (Step S159/Yes), the determination processing unit 35 determines which of the following conditions is satisfied: whether the counter value of the class 1 counter Cnt_1 is lower than the second number of samples N2 for the secondary determination processing and the determination processing mode is set to the secondary determination processing, or the counter value of the class 1 counter Cnt_1 is lower than the first number of samples N1 for the primary determination processing and the determination processing mode is set to the primary determination processing (Step S161).

When Step S161 is negatively determined (S161/No), the process directly proceeds to Step S165. On the other hand, when Step S161 is affirmatively determined (S161/Yes), the determination processing unit 35 counts up the class 1 counter Cnt_1 (Step S163), and the process proceeds to Step S165. In Step S165, the determination processing unit 35 determines which of the following conditions is satisfied: whether the counter value of the class 1 counter Cnt_1 is equal to or higher than the second threshold value M2 for the secondary determination processing and the determination processing mode is set to the secondary determination processing, or the counter value of the class 1 counter Cnt_1 is lower than the first threshold value M1 for the primary determination processing and the determination processing mode is set to the primary determination processing (Step S165).

When Step S165 is negatively determined (S165/No), the determination processing unit 35 maintains the classification of the occupant's physique in the determined result of last time and switches off the reset flag for resetting respective counter values (Step S167), and the process proceeds to Step S177. On the other hand, when Step S165 is affirmatively determined (S165/Yes), the determination processing unit 35 determines the classification of the occupant's physique to be the class 1 (Step S169). Next, the determination processing unit 35 determines whether the determined result of last time was the class "0" or not (Step S171). When Step S171 is affirmatively determined (S171/Yes), the determination processing unit 35 switches on the reset flag for resetting respective counter values (Step S175), and the process proceeds to Step S177. On the other hand, when Step S171 is negatively determined (S171/No), the determination processing unit 35 switches off the reset flag for resetting respective counter values (Step S173), and the process proceeds to Step S177.

In Step S177, the determination processing unit 35 determines which of the following conditions is satisfied: whether the total number of samples N calculated in Step S141 is equal to or larger than the second number of samples N2 for the secondary determination processing and the determination processing mode is set to the secondary determination processing or the total number of samples N is equal to or larger than the first number of samples N1 for the primary determination processing and the determination processing mode is set to the primary determination processing (Step S177). When Step S177 is negatively determined (S177/No), the process directly proceeds to Step S313. On the other hand, when Step S177 is affirmatively determined (S177/Yes), the determination processing unit 35 determines whether the counter value of the class "0" counter Cnt_0 exceeds zero or not (Step S179).

When Step S179 is negatively determined (S179/No), the process directly proceeds to Step S183. On the other hand, Step S170 is affirmatively determined (S179/Yes), the determination processing unit 35 counts down the counter value of the class "0" counter Cnt_0 (Step S181), and the process proceeds to Step S183.

In Step S183, the determination processing unit 35 determines whether the counter value of the class 2 counter Cnt_2 exceeds zero or not (Step S183). When Step S183 is negatively determined (S183/No), the process directly proceeds to Step S187. On the other hand, when Step S183 is affirmatively determined (S183/Yes), the determination processing unit 35 counts down the counter value of the class 2 counter Cnt_2 (Step S185), and the process proceeds to Step S187.

In Step S187, the determination processing unit 35 determines whether the counter value of the class 3 counter Cnt_3 exceeds zero or not (Step S187). When Step S187 is negatively determined (S187/No), the process directly proceeds to Step S191. On the other hand, when Step S187 is affirmatively determined (S187/Yes), the determination processing unit 35 counts down the counter value of the class 3 counter Cnt_3 (Step S189), and the process proceeds to Step S191.

In Step S191, the determination processing unit 35 determines whether the counter value of the indeterminable counter Cnt_ID exceeds zero or not (Step S191). When Step S191 is negatively determined (S191/No), the process directly proceeds to later-described Step 313. On the other hand, when Step S191 is affirmatively determined (S191/Yes), the determination processing unit 35 counts down the counter value of the indeterminable counter Cnt_ID (Step 193), and the process proceeds to later-described Step S313.

In these Steps S177 to S193, the number of samples N of the tentative determination results CDD used for the primary determination processing or the secondary determination processing reaches the first number of samples N1 or the second number of samples; therefore, the processing of reducing the counter values of the counters other than the class 1 counter Cnt_1 is performed.

On the other hand, in Step S195 to which the process proceeds through the above Step S155 or Step S157, the determination processing unit 35 determines whether the number of samples N of the tentative determination results CDD used for determining the vacant state (class 0) calculated in Step S141 is equal to or larger than the first number of samples N1 or not (Step S195). When Step S195 is negatively determined (S195/No), the process directly proceeds to Step S199. On the other hand, when Step S195 is affirmatively determined (S195/Yes), the determination processing unit 35 counts down a counter value of a Non-class 0 counter Cnt_N0 (Step S197), and the process proceeds to Step S199.

In these Steps S915 to S197, the number of samples N of the tentative determination results CDD used for processing of determining the class "0" reaches the first number of samples N1; therefore, the processing of reducing the counter values of the Non-class 0 counter Cnt_N0 is performed.

Next, the determination processing unit 35 determines whether the number of samples N of the tentative determination results CDD used for the primary determination processing or the secondary determination processing reaches the first number of samples N1 or the second number of samples N2 or not (Step S199), performing the processing of reducing counter values of counters other than the class 0 counter Cnt_N0 when the number of samples N reaches the first number of samples N1 or the number of samples N2 in Step S199 to Step 215. These Steps S199 to S215 correspond to processing in which the class 0 counter Cnt_N0 in the processing from the above Steps S177 to S193 is replaced with the class 1 counter Cnt_N1. After the processing of Step S199 to S215 is completed, the process proceeds to later-described Step S321.

When the above Step S159 is negatively determined (S159/No), the determination processing unit 35 determines whether the tentative determination result CDD in the processing cycle of this time is class 2 or not in Step S217 (Step S217). When Step S217 is affirmatively determined (S217/Yes), the determination processing unit 35 executes processing of determining whether the classification of the occupant's physique is determined to be class 2 or not (Step S221 to Step S235). Specifically, the similar processing is executed by replacing the class 1 counter Cnt_1 in the above processing of Step S161 to Step S175 with the class 2 counter Cnt_2. After the processing of Step S221 to Step S235 is completed, the process proceeds to later-described Step S277.

On the other hand, when Step S217 is negatively determined (S217/No), the determination processing unit 35 determines whether the tentative determination result CDD in this cycle is class 3 or not (Step S219). When Step S219 is negatively determined (S219/No), the determination processing unit 35 switches off the reset flag for resetting counter values of respective counters (Step S237). Next, the determination processing unit 35 determines which of the following conditions is satisfied: whether the counter value of the indeterminable counter Cnt_ID is lower than the second number of samples N2 for the secondary determination processing and the determination processing mode is set to the secondary determination processing or the counter value of the indeterminable counter Cnt_ID is lower than the first number of samples N1 for the primary determination processing and the determination processing mode is set to the primary determination processing (Step S239).

When Step S239 is negatively determined (S239/No), the process directly proceeds to Step S243. On the other hand, when Step S239 is affirmatively determined (S239/Yes), the determination processing unit 35 counts up the indeterminable counter Cnt_ID (Step S241), and the process proceeds to Step S243.

Next, the determination processing unit 35 determines whether the number of samples N of the tentative determination results CDD used for the primary determination processing or the secondary determination processing reaches the first number of samples N1 or the second number of samples N2 (Step S243), and performs processing of reducing counter values of counters other than the indeterminable counter Cnt_ID when the number of samples N reaches the first number of samples N1 or the second number of samples N2 in Step S243 to Step S259. These Step S243 to Step S259 correspond to processing in which the indeterminable counter Cnt_ID in the processing of the above Steps S177 to S193 is replaced with the class 1 counter Cnt_1. After the processing of Step S243 to S259 is completed, the process proceeds to later-described Step S313.

On the other hand, when the above Step S219 is affirmatively determined (S219/Yes), the determination processing unit 35 executes processing of determining whether the classification of the occupant's physique is determined to be the class 3 or not (Step S261 to Step S275). Specifically, the similar processing is executed by replacing the class 1 counter Cnt_1 in the above processing of Step S161 to Step S175 with the class 3 counter Cnt_3. After the processing of Step S261 to Step S275 is completed, the process proceeds to later-described Step S295.

In Step S277 to Step S293 to which the process proceeds after the above processing of Step S221 to Step S235 is completed, the determination processing unit 35 determines whether the number of samples N of the tentative determination results CDD used for the primary determination processing or the secondary determination processing reaches the first number of samples N1 or the second number of samples N2 (Step S277), and performs processing of reducing counter values of counters other than the class 2 counter Cnt_2 when the number of samples N reaches the first number of samples N1 or the second number of samples N2. These Step S277 to Step S293 correspond to processing in which the class 2 counter Cnt_2 in the processing of the above Steps S177 to S193 is replaced with the class 1 counter Cnt_1. After the processing of Step S277 to S293 is completed, the process proceeds to later-described Step S313.

In Step S295 to Step S311 to which the process proceeds after the above processing of Step S261 to Step S275 is completed, the determination processing unit 35 determines whether the number of samples N of the tentative determination results CDD used for the primary determination processing or the secondary determination processing reaches the first number of samples N1 or the second number of samples N2 (Step S295), and performs processing of reducing counter values of counters other than the class 3 counter Cnt_3 when the number of samples N reaches the first number of samples N1 or the second number of samples N2. These Step S295 to Step S311 correspond to processing in which the class 3 counter Cnt_3 in the processing of the above Steps S177 to S193 is replaced with the class 1 counter Cnt_1. After the processing of Step S295 to S311 is completed, the process proceeds to later-described Step S313.

In Step S313 to which the process proceeds after the processing of Step S177 to step S193, the processing of Step S243 to Step S259, the processing of Step S277 to Step S293 or the processing of Step S295 to Step S311 is completed, the determination processing unit 35 determines whether the Non-class 0 counter Cnt_N0 is smaller than the number of samples N1 or not (Step S313). When Step S313 is negatively determined (S313/No), the process directly proceeds to Step S317. On the other hand, when Step S313 is affirmatively determined (S313/Yes), the determination processing unit 35 counts up the Non-class 0 counter Cnt_N0 (Step S315), and the process proceeds to Step S317.

In Step S317, the determination processing unit 35 determines whether the Non-class 0 counter Cnt_N0 is equal to or larger than the first number of samples N1 or not (Step S317). When Step S317 is negatively determined (S317/No), the process directly proceeds to Step S321. On the other hand, when Step S317 is affirmatively determined (S317/Yes), the determination processing unit 35 counts down the Non-class 0 counter Cnt_N0 (Step S319), and the process proceeds to Step S321.

In Step S321 to which the process proceeds after the processing of Step S317 or Step S319, or the above processing of Step S199 to Step S215 is completed, the determination processing unit 35 maintains the determined result of the current classification of the occupant's physique as the determined result without change (Step S321). Next, the determination processing unit 35 determines whether the reset flag for resetting counter values of respective counters is switched on or not (Step S323). When Step S323 is negatively determined (S323/No), the determination processing unit 35 ends the routine in this state. On the other hand, when Step S323 is affirmatively determined (S323/Yes), the determination processing unit 35 resets counter values of respective counters (Step S325) and ends the routine.

Figure 19:
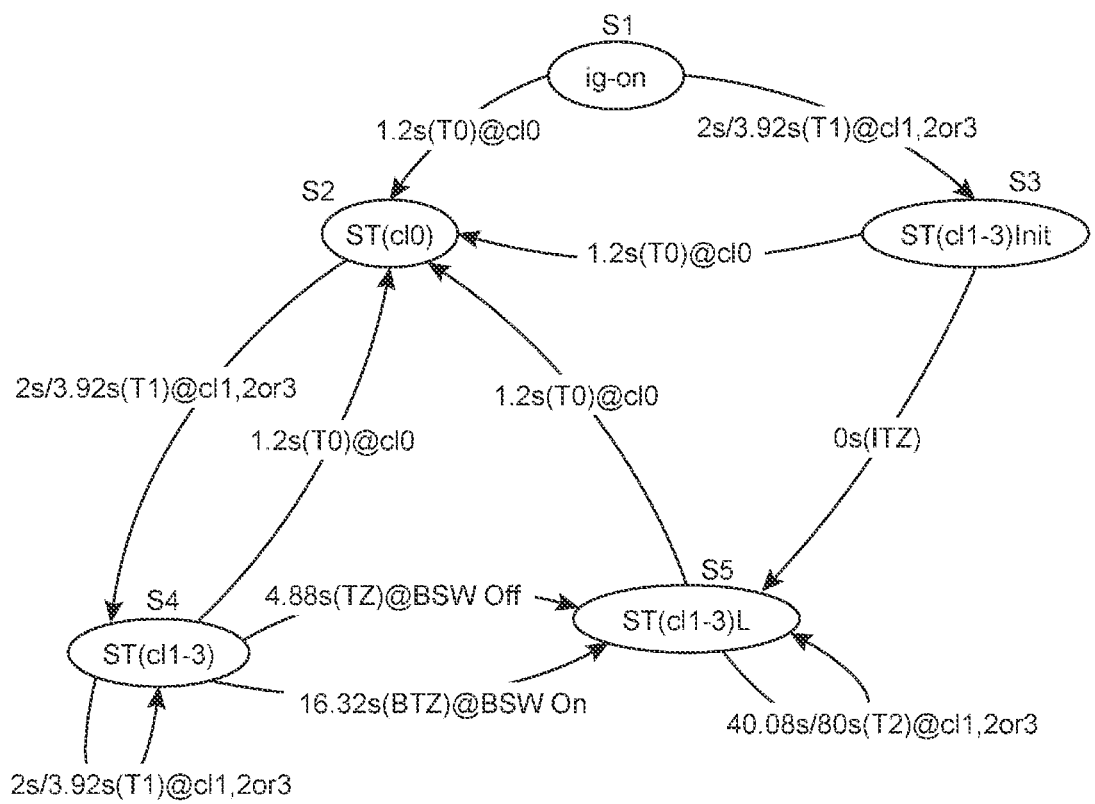
FIG. 19 is an explanatory view showing transition at the time of performing determination processing of the occupant's physique in accordance with the above operation examples by the determination processing unit of the occupant determination device according to the embodiment.

FIG. 19 is an explanatory view showing transition at the time of performing determination processing of the occupant's physique in accordance with the above operation examples by the determination processing unit 35. In the example shown in FIG. 19, the determination processing unit 35 executes the primary determination processing by setting the first number of samples N1 to 49 and setting the first threshold value M1 to 25, and executes the secondary determination processing by setting the second number of samples N2 to 1,000 and setting the second threshold value M2 to 501. The determination processing unit 35 determines the class "0" by setting the threshold value for determining vacant seat M0 to 15.

Therefore, when the operation processing cycle of the electronic controller 20 is 0.08 seconds, the classification of the occupant's physique is determined to be a class having 25 times or more tentative determination results CDD classified into any of the classes 1 to 3 in 49-times tentative determination results CDD tentatively determined during latest 3.92 seconds (a first class-transition determination condition T1) in the primary determination processing. In this case, when tentative determination results CDD classified into a class different from the currently-determined class continue 25 times successively, the transition is made to the different class in the shortest 2 seconds.

Moreover, when the operation processing cycle of the electronic controller 20 is 0.08 seconds, the classification of the occupant's physique is determined to be a class having 501 times or more tentative determination results CDD classified into any of the classes 1 to 3 in 1,000-times tentative determination results CDD tentatively determined during latest 80 seconds (a second class-transition determination condition T2) in the secondary determination processing. In this case, when tentative determination results CDD classified into a class different from the currently-determined class continue 501 times successively, the transition is made to the different class in the shortest 40.08 seconds.

Furthermore, when the operation processing cycle of the electronic controller 20 is 0.08 seconds, the classification of the occupant's physique is determined to be the class "0" in 1.2 seconds when tentative determination results CDD classified into the class "0" continue 15 times (a vacant seat determination condition T0).

After the occupant determination device 10 is activated, the classification of the occupant's physique is executed as follows.

When the ignition switch of the vehicle is turned on (Step S1), the classification of the occupant's physique is determined to be the class "0" by the vacant seat determination condition T0 in a case where no occupant is seated on the seat 11 (Step S2). On the other hand, when the ignition switch of the vehicle is turned on (Step S1), the classification of the occupant's physique is determined to be any of the classes 1 to 3 (Step S3) by the first class transition condition T1 in a case where the occupant is seated on the seat 11.

When the classification of the occupant's physique is determined to be class 1 to class 3 in Step S3, in a case where the tentative determination result CDD of the class "0" is obtained after that, the classification of the occupant's physique is determined to be the class "0" by the vacant seat determination result T0 (Step S2). On the other hand, when the classification of the occupant's physique is determined to be class 1 to class 3, in a case where the tentative determination result CDD of any of the classes 1 to 3 is obtained after that, the class transition determination condition is speedily switched to the second class-transition determination condition T2 (to Step S5).

In the case where the classification of the occupant's physique is determined to the class "0" in Step S2, the classification of the occupant's physique is determined to any of the classes 1 to 3 by the first class-transition determination condition T1 when the occupant is seated on the seat 11 (Step S4). After that, the classification of the occupant's physique by the first class-transition determination condition T1 is continued while the occupant is seated. On the other hand, in a case where the occupant leaves the seat after the classification of the occupant's physique is determined to any of the classes 1 to 3, the classification of the occupant's physique is determined to the class "0" by the vacant seat determination condition T0 (Step S2).

Furthermore, in the case where the classification of the occupant's physique is determined to any of the classes 1 to 3 in Step S4, the first class-transition determination condition T1 is made to transition to the second class-transition determination condition T2 after the second switching time TZ passes when the buckle of the seat belt is not fastened (Step S5). When the buckle of the seat belt is fastened, the first class-transition determination condition T1 is made to transition to the second class-transition determination condition T2 after the first switching time BTZ passes (Step S5).

After the transition to Step S5, the classification of the occupant's physique is continued by the second class-transition determination condition T2 while the occupant is seated. On the other hand, when the occupant leaves seat after the transition to Step S5, the classification of the occupant's physique is determined to be the class "0" by the vacant seat determination condition T0 (Step S2).

As explained above, in the occupant determination device 10 according to the embodiment, when the number of tentative determination results CDD classified into a given class becomes equal to or higher than the first threshold value M1 in the tentative determination results CDD of the first number of samples N1, the occupant's physique is determined to the given class in the primary determination processing. Moreover, in the occupant determination device 10 according to the embodiment, when the number of tentative determination results CDD classified into a given class becomes equal to or higher than the second threshold value M2 in the tentative determination results CDD of the second number of samples N2, the occupant's physique is determined to the given class in the secondary determination processing. Accordingly, it is possible to suppress easy transition to another class due to vibration of detected loads by the load sensors 13.

Moreover, the occupant determination device 10 according to the embodiment executes classification of the occupant's physique by transferring to the secondary determination processing having a larger parameter of the number of samples than the primary determination processing after the classification of the occupant's physique is determined to be any of the classes 1 to 3 by the primary determination processing. Therefore, stability in the determined result in the classification of the occupant's physique is increased. In that case, the occupant determination device 10 changes the time in which the primary determination processing is transferred to the second determination processing depending on whether the buckle of the seat belt is fastened or not. Accordingly, it is possible to prevent a wrongly determined class from being held for a long time in a case where the load applied to the load sensors 13 is increased though the occupant is not seated such as a case of installing a child seat.

In the occupant determination device 10 according to the embodiment, the determination of the vacant state (class 0) is made by using the threshold value M0 for determining the vacant seat different from the threshold values M1, M2 used for determination processing to any of the classes 1 to 3. Accordingly, the vacant state can be determined speedily.

Furthermore, the occupant determination device 10 according to the embodiment changes the load threshold value W_thre so as to expand the range of the class to which the current tentative determination result belongs in the case where the determined result by the determination processing unit 35 is not the determination result of the class "0" or the determination result indicating that the determination is difficult. Accordingly, it is possible to suppress easy transition to another class due to vibration of detected loads by the load sensors 13. The occupant determination device 10 also changes the load threshold value W_thre so as to further expand the range of the class to which the current tentative determination result belongs in the case where the determination result is not the class "0" or the indeterminable result and the buckle of the seat belt is fastened. Accordingly, it is possible to further suppress easy transition to another class due to vibration of detected loads by the load sensors 13 in the case where the occupant is seated.

The preferred embodiment of the present invention has been explained with reference to the attached drawings, and the present invention is not limited to the above embodiment. It is obvious for those skilled in the technical field to which the present invention belongs can easily arrive at various alteration examples or modification examples within a scope of technical ideas described in claims, which naturally belong to the technical scope of the present invention.

What is claimed is:

1. An occupant determination device comprising a processor including:
   a tentative-determination processing unit classifying a physique of an occupant seated on a seat of a vehicle by comparing a determination value set based on sensor values of a plurality of load sensors for detecting loads applied to the seat with predetermined load threshold values; and
   a determination processing unit determining the physique of the occupant by using tentative determination results by the tentative-determination processing unit,
   wherein, when a number of the tentative determination results classified into a given class becomes equal to or larger than a predetermined threshold value in the tentative determination results of a predetermined number of samples, the determination processing unit determines the physique of the occupant to be the given class,
   wherein the determination processing unit performs a primary determination processing by setting the predetermined number of samples to a first number of samples and setting the predetermined threshold value to a first threshold value, and performs a secondary determination processing by setting the predetermined number of samples to a second number of samples larger than the first number of samples and setting the predetermined threshold value to a second threshold value higher than the first threshold value after the physique of the occupant is determined to be the given class by the primary determination processing,
   wherein a period of time until transferring to the secondary determination processing after the physique of the occupant is determined to be the given class by the primary determination processing differs according to whether a buckle of a seat belt for the seat is fastened or not,
   wherein, the determination processing unit determines classification indicating that the seat is vacant when the tentative determination results classified as a vacant seat by the tentative-determination processing unit continue for a threshold value for determining the vacant seat or more which is lower than the first threshold value,
   wherein the tentative-determination processing unit changes the load threshold values so that a range of a class to which the tentative determination result belongs is further expanded in the case where the determined result by the determination processing unit is neither the determination result indicating that the seat is vacant nor the determination result indicating that determination is difficult, and further, in a case where the buckle of the seat belt for the seat is fastened, and
   wherein, when it is determined that the seat is vacant, or it is difficult to determine the physique of the occupant in the secondary determination processing, restarting the processing from the primary determination processing.

2. The occupant determination device according to claim 1,
   wherein the determination value is a total value of loads detected by the plural load sensors or a value correlated with the total value.

3. The occupant determination device according to claim 1,
   wherein the processor is disposed in the seat of the vehicle and the tentative-determination processing unit changes the load threshold values in accordance with a determined result by the determination processing unit.

4. The occupant determination device according to claim 1,
   wherein at least one of the tentative-determination processing unit and the determination processing unit is set so as not to determine that the seat is vacant in a case where the buckle of the seat belt for the seat is fastened.

5. The occupant determination device according to claim 1,
   wherein, the determination processing unit determines classification indicating that the seat is vacant when the tentative determination results classified as a vacant seat by the tentative-determination processing unit continue for a threshold value for determining the vacant seat or more which is lower than the first threshold value.

6. The occupant determination device according to claim 1,
   wherein, when it is determined that the seat is vacant, or it is difficult to determine the physique of the occupant in the secondary determination processing, the determination processing unit restarts the processing from the primary determination processing.

7. The occupant determination device according to claim 1,
where in the determination value is a total value of loads detected by the plural load sensors or a value correlated with the total value.

8. The occupant determination device according to claim 1, wherein the processor is disposed in the seat of the vehicle.

9. The occupant determination device according to claim 1, wherein the tentative-determination processing unit and the determination processing unit that are included in the processor are functions realized by execution of software programs.

10. The occupant determination device according to claim 1, wherein a period of time until transferring to the secondary determination processing after the physique of the occupant is determined to be the given class by the primary determination processing differs according to whether the buckle of the seat belt for the seat is fastened or not.

* * * * *